United States Patent
Deixler et al.

(10) Patent No.: US 11,523,254 B2
(45) Date of Patent: Dec. 6, 2022

(54) DETERMINING A SUITABILITY OF NETWORK NODES FOR RF-BASED PRESENCE AND/OR LOCATION DETECTION

(71) Applicant: SIGNIFY HOLDING B.V., Eindhoven (NL)

(72) Inventors: Peter Deixler, Arlington, MA (US); Hugo José Krajnc, Eindhoven (NL); Leendert Teunis Rozendaal, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/272,298

(22) PCT Filed: Aug. 22, 2019

(86) PCT No.: PCT/EP2019/072478
§ 371 (c)(1),
(2) Date: Feb. 27, 2021

(87) PCT Pub. No.: WO2020/043592
PCT Pub. Date: Mar. 5, 2020

(65) Prior Publication Data
US 2021/0185485 A1 Jun. 17, 2021

(30) Foreign Application Priority Data

Aug. 27, 2018 (EP) .................................... 18191015
Feb. 15, 2019 (EP) .................................... 19157425
(Continued)

(51) Int. Cl.
*H04W 24/00* (2009.01)
*H04W 4/029* (2018.01)
(Continued)

(52) U.S. Cl.
CPC ............. *H04W 4/029* (2018.02); *H04W 4/80* (2018.02); *H04W 64/003* (2013.01); *H04W 84/18* (2013.01)

(58) Field of Classification Search
CPC ..... H04W 4/029; H04W 4/80; H04W 64/003; H04W 84/18; H04W 52/143;
(Continued)

(56) References Cited

U.S. PATENT DOCUMENTS

| 8,923,324 B2 | 12/2014 | Guthrie |
| 9,002,522 B2 | 4/2015 | Mohan et al. |

(Continued)

FOREIGN PATENT DOCUMENTS

| EP | 2197229 A2 | 6/2010 |
| EP | 3100250 A1 | 12/2016 |

(Continued)

OTHER PUBLICATIONS

Rayes, et al., "The Things in IoT: Sensors and Actuators", Internet of Things from Hype to Reality; the Road to Digitization, Oct. 22, 2018, pp. 73-74.
(Continued)

*Primary Examiner* — Tanmay K Shah

(57) ABSTRACT

A system (1) for selecting one or more devices in a wireless network for transmitting, receiving and/or processing a radio frequency signal for presence and/or location detection comprises at least one processor (5) configured to determine a suitability of each of a plurality of devices (11-15) for transmitting, receiving and/or processing a radio frequency signal for presence/or location detection, select a subset of devices from the 5 plurality of devices based on the suitability determined for each of the plurality of devices, and instruct at least one of the subset of devices to act as a device for transmitting, receiving and/or processing a radio frequency signal for presence and/or location detection.

13 Claims, 9 Drawing Sheets

(30) Foreign Application Priority Data

Feb. 15, 2019 (EP) .................................... 19157431
Feb. 15, 2019 (EP) .................................... 19157438

(51) Int. Cl.
*H04W 4/80* (2018.01)
*H04W 64/00* (2009.01)
*H04W 84/18* (2009.01)

(58) Field of Classification Search
CPC .. H04W 52/226; H04W 52/283; G08B 29/18; H05B 47/19
USPC ...................................................... 455/456.1
See application file for complete search history.

(56) References Cited

U.S. PATENT DOCUMENTS

| | | |
|---|---|---|
| 2005/0073983 A1 | 4/2005 | Maruyama et al. |
| 2009/0129273 A1 | 5/2009 | Zou |
| 2010/0060514 A1 | 3/2010 | Wang et al. |
| 2010/0178929 A1* | 7/2010 | Kennedy, Jr. ........ H04B 1/1081 455/456.1 |
| 2013/0069543 A1 | 3/2013 | Mohan et al. |
| 2014/0293993 A1 | 10/2014 | Ryhorchuk |
| 2017/0132909 A1* | 5/2017 | Rabb ...................... G08B 29/18 |
| 2017/0188181 A1 | 6/2017 | Jin et al. |
| 2017/0359804 A1 | 12/2017 | Manku et al. |

FOREIGN PATENT DOCUMENTS

| | | |
|---|---|---|
| WO | 2011098931 A1 | 8/2011 |
| WO | 2015114123 A1 | 8/2015 |

OTHER PUBLICATIONS

Silicon Labs, Expand Device Capability with Multiprotocol Bluetooth and Zigbee Connectivity, 2018, pp. 1-7.

Yang, et al., "CeilingSee: Device-Free Occupancy Inference Through Lighting Infiastructure Based LED Sensing", Mar. 2017, pp. 1-10.

Feng, et al., "Efficient and Adaptive Node Selection for Target Tracking in Wireless Sensor Network", Hindawi Publishing Corporation, Journal of Sensors, 2016, pp. 1-10.

* cited by examiner

DETERMINING A SUITABILITY OF NETWORK NODES FOR RF-BASED PRESENCE AND/OR LOCATION DETECTION

CROSS-REFERENCE TO PRIOR APPLICATIONS

This application is the U.S. National Phase application under 35 U.S.C. § 371 of International Application No. PCT/EP2019/072478, filed on Aug. 22, 2019, which claims the benefits of European Patent Application No. 19157431.8, filed on Feb. 15, 2019, European Patent Application No. 19157438.3, filed on Feb. 15, 2019, European Patent Application No. 19157425.0, filed on Feb. 15, 2019, and European Patent Application No. 18191015.9, filed on Aug. 27, 2018. These applications are hereby incorporated by reference herein.

FIELD OF THE INVENTION

The invention relates to a system, a method and a computer program for RF-based presence detection and/or localization.

In particular, the invention relates to a system for selecting one or more devices in a wireless network for transmitting, receiving and/or processing a radio frequency signal for presence and/or location detection, a method of selecting one or more devices in a wireless network for transmitting, receiving and/or processing a radio frequency signal for presence and/or location detection and a computer program product enabling a computer system to perform such a method.

BACKGROUND OF THE INVENTION

RF-based presence detection is a promising technology that may replace or enhance PIR-based presence detection. RF-based localization allows devices to be located indoors. RF-based presence detection is disclosed in US 2017/0359804 A1, for example.

US 2017/0359804 A1 discloses a first wireless network device communicating wireless network traffic on a first subset of wireless communication channels in a wireless network. The first wireless network device receives motion detection signals transmitted through a space by a second wireless network device. The motion detection signals are received on a second subset of wireless communication channels. The motion detection signals are processed to detect motion of an object in the space.

Typically, all devices capable of performing RF-based presence detection and/or localization would be configured to help perform this RF-based presence detection and/or localization in the system of US 2017/0359804 A1. However, performing this task reduces a device's capacity to communicate wireless network traffic and configuring all capable devices to perform RF-based presence detection and/or localization might not be optimal use of resources in certain applications.

US20100178929A1 discloses a system and method in a wireless communication system having plural base stations and a MSC with a network overlay geo-location system.

US20170132909A1 discloses a system which are provided for security system re-arming. Input invoking restricted credentials may be received. The security system of an environment may be changed from a first mode to a second mode based on the restricted credentials. The restricted credentials used to change the security system to the second mode may be determined to be near expiration based on an expiration condition of the restricted credentials. A notification may be sent to a person associated with the restricted credentials including a reminder to use the restricted credentials to change the security system to the first mode before the restricted credentials expire.

SUMMARY OF THE INVENTION

It is a first object of the invention to provide a system, which is able to configure a wireless network to perform RF-based presence detection and/or localization while leaving sufficient resources, e.g. bandwidth, for network communication.

It is a second object of the invention to provide a method, which is able to configure a wireless network to perform RF-based presence detection and/or localization while leaving sufficient resources, e.g. bandwidth, for network communication.

In a first aspect, the system for selecting one or more devices in a wireless network for transmitting, receiving and/or processing a radio frequency signal for presence and/or location detection comprises at least one processor configured to determine a suitability of each of a plurality of devices for transmitting, receiving and/or processing a radio frequency signal for presence and/or location detection, select a subset of devices from said plurality of devices based on said suitability determined for each of said plurality of devices, and instruct at least one of said subset of devices to act as a device for transmitting, receiving and/or processing a radio frequency signal for presence and/or location detection. This system is also referred to as "controller" or "orchestrator".

The inventors have recognized that in certain situations not all devices in a wireless network should transmit, receive and/or process a radio frequency signal for presence and/or location detection, but that it is beneficial to select a subset of devices based on their suitability for this function in these situations. By not selecting devices that are not suitable or are less suitable, these devices have more time for network communication and resources for network communication are thus not wasted. RF-based presence detection is also referred to as RF-based sensing and RF-based localization (location detection) is also referred to as RF-based asset tracking. Thus, more suitable devices are preferred over less suitable or non-suitable devices.

Said plurality of devices may comprise at least one light device. Light devices are more and more equipped with wireless transceivers to enable smart functionality and are often located in quantities and at locations well suited for RF-based presence and/or location detection applications. Presence detection may be used to perform people counting or people tracking, for example. If a user is detected to be present, a posture or a movement of his body may be determined. The term RF-based presence detection covers any RF-based sensing application. Location detection may be used to perform gesture detection, for example. The term RF-based location detection covers any RF-based tracking application. The network may be mesh network or a star network, for example. For instance, in a star configuration, a gateway may connect with a single hop to all lights in the room. In this case, one or more of the lights may be selected for RF-based sensing.

Said at least one processor may be configured to determine at least part of said suitability of a device of said plurality of devices by assessing expected and/or past use of a lighting function and/or network function of said device and/or any other expected and/or past use of said device. For example, a light that is always on may be preferable to a light of which the on/off state changes often. The expected use of a lighting function may be derived from a floorplan or from other devices in similar situations (e.g. from devices on a floor in the same building on which wireless lighting has already been installed).

When assessing the use of a network function, how this use is performed may also be assessed. For example, a node that is used a lot to route messages between two other nodes and succeeds 100% of the times in relaying the message does not perform the same as a node that does the same routing, but succeeds only 70%. The latter could be an indication of some external factor affecting the node's operation (regardless of the level of usage). The performance of a network function such as routing messages and being a proxy node for streaming could possibly also result in visible impact (though not necessarily on the device itself, but rather on nodes served by it) and this use of the device may be assessed as well.

Said at least one device may use a first protocol to transmit, receive and/or process a radio frequency signal and a second protocol to receive network messages. For example, network messages may be received using the Zigbee protocol or the Thread protocol and RF based presence and/or location detection may performed using Bluetooth signals. Alternatively, said at least one device may use the same protocol, e.g. Zigbee, to transmit, receive and/or process a radio frequency signal and receive network messages.

Said least one processor may be configured to determine at least part of said suitability of a device of said plurality of devices by assessing at least one of: said device's hardware and software capabilities, said device's RF characteristics, said device's mounting orientation, wireless interference close to said device, and whether said device is operated by a battery-operated wall switch, a legacy wall switch, an occupancy sensor, a motion sensor, a vacancy sensor, a window blind controller, a sensor bundle and/or a mains-powered wireless-switch. Said RF characteristics may comprise radiation patterns, directionality of the antenna, transmit power, and/or reception sensitivity, for example. Said sensor bundle may comprise a $CO_2$ sensor, a humidity sensor, a microphone (for sound analytics), a volatile organic component sensor and/or a temperature sensor, for example. Sensors that use Ultra Wide Band (UWB) and LiFi sensor technologies may also be used.

A light controlled by a legacy wall switch may be considered to be less suitable, because the light switch cuts the power to the light, thereby making it incapable to perform RF-based sensing. If a light is controlled by an occupancy sensor, it may be considered to be less suitable for RF-based sensing, as the latency to respond to a change of occupancy might be worsened. If a light is equipped with a sensor bundle but the sensor bundle output is not used for the purpose of real-time adjustments of the light output of other lighting devices (e.g. certain wireless lights map the temperature and humidity across the room without any dynamic lighting control e.g. an emergency lighting fixture) and/or not used for real time adjustment of this lighting device hosting the sensor bundle, the latency will typically not be critical.

Said at least one processor may be configured to select said subset of devices as part of commissioning said plurality of devices and/or after commissioning said plurality of devices. Said subset of devices may be selected after use of said plurality of devices or after receiving information from a similar building space elsewhere (e.g. from another floor or another building). In the commissioning process, some devices may be marked as being more or less suitable for the sending function than others. A suitability of a device may be determined, for instance, based on how critical the device is for routing messages. The latter is an indication of how much additional resources/bandwidth the device would have left for additional RF-based sensing. A suitability of a device may alternatively or additionally be determined, for instance, based on how much non-routing or non-rebroadcasting traffic a device needs to send (sensor) or receive (actuator, e.g. light), as the associated latency requirement may influence the decision on suitability.

Said at least one processor may be configured to determine said suitability of each of said plurality of devices for transmitting, receiving and/or processing said radio frequency signal by determining a suitability of a plurality of groups of said plurality of devices for transmitting, receiving and/or processing said radio frequency signal. Each group comprises at least two of said plurality of devices and will normally comprise a first device for transmitting the RF signal and one or more second devices for receiving the RF signal. It may be advantageous to select as first device a device which can be heard by as many other devices in the vicinity as possible. If this device can be heard by a plurality of other devices, this device may be included as first device in a plurality of groups over another device which is heard by fewer nodes. Thereby, many devices can determine the RSSI based on the same single signal sent by the first device. For instance, in a commercial office setting, messages of a light close to a normally open firewall door interconnecting two office sub-spaces may be heard by many more lights in both subspaces as another light in vicinity of the firewall but farther away. It may be advantageous to select as second device a device which can hear as many other devices in the vicinity as possible. The groups may be pairs, for example.

Said least one processor may be configured to determine whether two groups of said plurality of devices have a device in common and target a same or adjacent sensing area and determine one of said two groups not to be suitable in dependence on said determination. This may be beneficial if the device in common is the second device, i.e. the device receiving the RF signal, in at least one of the two groups, or if the device in common is the first device, i.e. the device transmitting the RF signal, in both groups and it is not possible to transmit a single RF signal to both receiving devices. If the two groups have the same transmitting device in common and the receiving devices are able to receive and process the same RF signal from this transmitting device, then this may have advantages when it comes to efficient use of the wireless spectrum. The groups may be pairs, for example.

Said least one processor may be configured to determine whether a communication quality between a pair of said plurality of devices is below a certain threshold and determine said pair not to be suitable in dependence on said determination.

Said least one processor may be configured to determine, at a later moment, a further suitability of each of said plurality of devices for transmitting, receiving and/or processing said radio frequency signal, select a further subset of devices from said plurality of devices based on said further suitability determined for each of said plurality of devices, and instruct at least one of said further subset of devices to act as a device for transmitting, receiving and/or processing a radio frequency signal for presence and/or location detection. By determining the suitability repeatedly, changes in the devices or in the environment may be taken into account. For instance, a piece of office furniture may be shifted, worsening the detection performance of the original detection pair of lights, a device may be regularly depowered, or a device may suffer interference from a nearby WiFi access point during office hours (which likely won't be detected at the time of installation in a building since at that moment WiFi might not yet be installed and certainly not heavily used by the employees).

The further suitability of a device may depend on its current role in the network. For example, if a device has one or more Zigbee end-device (ZED) children, if a device is routing on behalf of other nodes, or if a device is proxying for a Zigbee Green Power Device (GPD) (especially if there are only few selected proxies), then it is beneficial not to switch this device from a Zigbee routing role to a Zigbee end-device role. If a luminaire comprises multiple Zigbee devices, then one of these devices may have a role as Zigbee end-device and the other may have a role as Zigbee router. The former device could then be selected for transmitting, receiving and/or processing the radio frequency signal.

Said at least one processor may be configured to determine at least part of said suitability of a device of said plurality of devices based on historical data relating to said device and/or by assessing said device's spatial location and/or environmental condition. As an example of the latter, if RF-based sensing is performed by garden lighting, a luminaire in the sun might have different sensitivity than a luminaire in the shade, e.g. due to expansion of substrates which lead to variations in a track antenna's length and thermal shift of component values like RF matching circuits and crystals, which lead to a deviated carrier frequency with respect to the center frequency of the selected band, for example. Said environmental condition may be a weather condition, for example.

Said at least one processor may be configured to determine a transmission power and/or directionality for a radio frequency signal to be transmitted by said device based on said device's spatial location.

Said at least one processor may be configured to determine said suitability of each of said plurality of devices for transmitting, receiving and/or processing said radio frequency sensing signal for a certain type of detection.

Said at least one processor may be configured to determine at least part of said suitability of a device of said plurality of devices based on an amount of time available to said device for transmitting or receiving said radio frequency signal.

In a second aspect, the method of selecting one or more devices in a wireless network for transmitting, receiving and/or processing a radio frequency signal for presence and/or location detection comprises determining a suitability of each of a plurality of devices for transmitting, receiving and/or processing a radio frequency signal for presence and/or location detection, selecting a subset of devices from said plurality of devices based on said suitability determined for each of said plurality of devices, and instructing at least one of said subset of devices to act as a device for transmitting, receiving and/or processing a radio frequency signal for presence and/or location detection. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a software code portion, the software code portion, when executed or processed by a computer, being configured to perform executable operations comprising: determining a suitability of each of a plurality of devices for transmitting, receiving and/or processing a radio frequency signal for presence and/or location detection, selecting a subset of devices from said plurality of devices based on said suitability determined for each of said plurality of devices, and instructing at least one of said subset of devices to act as a device for transmitting, receiving and/or processing a radio frequency signal for presence and/or location detection.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java™, Smalltalk, C++ or the like, conventional procedural programming languages, such as the "C" programming language or similar programming languages, and functional programming languages such as Scala, Haskell or the like. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
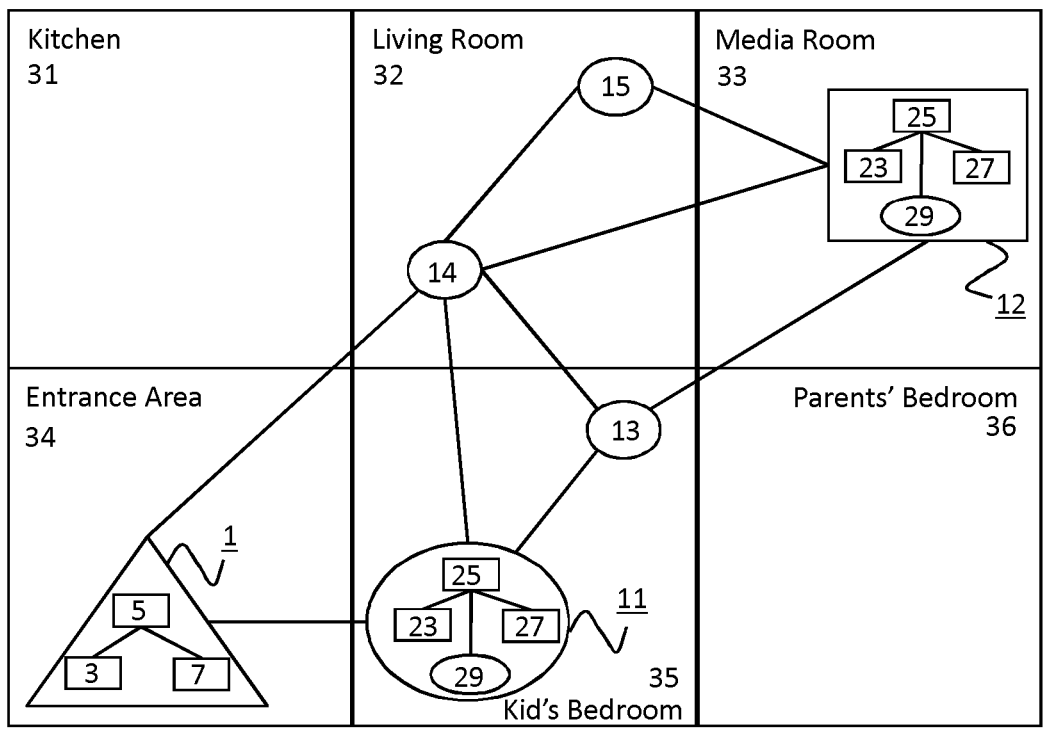
FIG. 1 is a block diagram of an embodiment of the systems of the invention and of an embodiment of the electronic device of the invention.

FIG. 1 shows embodiments of the systems and the electronic device of the invention. In the embodiment of FIG. 1, the bridge 1 combines the functionality of the system for controlling message routing within a wireless network of the invention and the system for selecting one or more devices in a wireless network for transmitting, receiving and/or processing a radio frequency signal for presence and/or location detection of the invention. In an alternative embodiment, the bridge 1 only implements one of these two functionalities. In a different embodiment, the systems are implemented in different types of devices. Each system may comprise one or multiple devices.

In the embodiment of FIG. 1, two electronic devices of the invention are shown: lighting devices 11 and 12. Three other lighting devices are shown in FIG. 1: lighting devices 13, 14 and 15. The lighting device 11 is a Hue go luminaire, the lighting device 12 comprises LED strips, the lighting device 13 is a ceiling lamp, the lighting device 14 is a floor-standing lamp and lighting device 15 is a table lamp. In the embodiment of FIG. 1, Lighting devices 13-15 are not configured to perform RF-based sensing or asset tracking in a first part of a period and obtain network messages in a second part of this period, unlike lighting devices 11 and 12. In an alternative embodiment, lighting devices 13-15 are, similar to lighting devices 11 and 12, also configured to perform RF-based sensing or asset tracking in a first part of a period and obtain network messages in a second part of this period. Bridge 1 and lighting devices 11-15 form a wireless mesh network and are also referred to as nodes.

The bridge 1 comprises a processor 5, a transceiver 3, and a memory 7. The processor 5 is configured to determine a first subset of the lighting devices 11-15. The first subset comprises one or more devices that are assigned a radio frequency-based presence and/or location detection function. The processor 5 is further configured to determine a plurality of routes from a source node to a destination node. At least one of the plurality of routes comprises one or more intermediate nodes. The processor 5 is further configured to select one of the plurality of routes based on how many of the intermediate nodes of each of the plurality of routes are part of the first subset of the plurality of nodes and use the transceiver 3 to transmit one or more messages to cause the wireless mesh network to perform message routing according to the selected route.

In some wireless standards, e.g. Zigbee, various routing mechanisms can be available and/or active. Some of these are determined by the sending device (source routing: the sender instructs the path to be used for the message), some of these are determined in a distributed fashion (AODV routing) where the nodes in the Zigbee network build up routing tables based on sent and received messages. In the former case, the processor 5 can instruct (e.g. via Manufacturer Specific messages) a sending device to use a specific route. In the latter case, the processor 5 could influence the routing e.g. by sending Manufacturer Specific messages to instruct the various Zigbee nodes to influence this distributed process in such a way that the preferred routes as described in the previous paragraph are accomplished (or encouraged) and/or unwanted routes are avoided (or discouraged), e.g. by deliberately adjusting routing cost. Another mechanism could be where the role (NCN/BRM) of nodes, and possibly the role of neighboring devices, is used to influence the routing decision the nodes make (and/or routing costs the nodes announce), and thus also influence the routing decision of neighboring devices.

The processor 5 is further configured to determine a suitability of each of the lighting devices 11-15 for transmitting, receiving and/or processing a radio frequency signal for presence and/or location detection, select a subset of devices from the plurality of devices based on the suitability determined for each of the plurality of devices, and instruct at least one of the subset of devices to act as a device for transmitting, receiving and/or processing a radio frequency signal for presence and/or location detection. The payload of the transmitted wireless message, from which the receiving lights can determine the RSSI utilized in the RF-based sensing, may include the reporting of the RSSI data of other messages which the transmitting device itself has received earlier from other devices in the network. Hence, the RF-based sensing messages may not have just dummy payloads but payloads with a meaning.

The lighting devices 11 and 12 comprise a processor 25, a transceiver 23, a memory 27, and a light source 29. The processor 25 is configured to use a first protocol to transmit and/or receive a radio frequency signal during a first part of each of a plurality of periods. The radio frequency signal is used for presence and/or location detection. The processor 25 is further configured to obtain network messages transmitted wirelessly using a second protocol during a second part of each of the plurality of periods. The second part does not overlap with the first part. A duration of the first part varies between at least two of the plurality of periods and/or a duration of the second part varies between at least two of the plurality of periods.

RF-based presence detection is also referred to as RF-based sensing. RF-based sensing may be used if a target needs to be detected that does not carry a dedicated transmitter or receiver and does not transmit or receive any signal. RF-based localization (or location detection) is also referred to as RF-based asset tracking (the asset may be an object, animal or person, for example). RF-based asset tracking may be used if a target/asset needs to be detected and/or located that carries or incorporates a dedicated transmitter or receiver. The asset being tracked may receive or transmit BLE beacons, for example. RF-based sensing offers the possibility to detect motion or presence by analyzing the dynamic variation of diagnostic data and communication parameters of a wireless communication system, such as e.g. received signal strength or other network diagnostics data (e.g. number of retries until a message is successfully delivered) changes on the wireless links between different nodes of a network.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g. ARM-based, or an application-specific processor. The processor 5 of the bridge 1 may run a Unix-based operating system for example. The memory 7 may comprise one or more memory units. The memory 7 may comprise one or more hard disks and/or solid-state memory, for example. The memory 7 may be used to store a table of connected lights, for example.

The transceiver 3 may use one or more communication technologies to communicate with the light devices, e.g. Zigbee, Thread and/or Bluetooth, and/or one or more wired or wireless communication technologies to communicate with a wireless LAN/Internet access point (not shown), e.g. Ethernet or Wi-Fi. In an alternative embodiment, multiple transceivers are used instead of a single transceiver. In the embodiment shown in FIG. 1, a receiver and a transmitter have been combined into a transceiver 3. In an alternative embodiment, one or more separate receiver components and one or more separate transmitter components are used. The bridge 1 may comprise other components typical for a network device such as a power connector. The invention may be implemented using a computer program running on one or more processors.

Some of the functions performed by the bridge 1 in the embodiment of FIG. 1 are performed by an Internet server in an alternative embodiment. This is especially beneficial for more sophisticated RF-based presence detection algorithms or RF-based people counting. For security class use cases, a longer latency (e.g. 10 seconds) is typically acceptable, while for lighting class use cases (e.g. switching the lights on) a latency of 0.5 seconds or less is desirable, making a round trip to an Internet server potentially problematic.

In the embodiment of the lighting devices 11 and 12 shown in FIG. 1, the lighting devices 11 and 12 comprise one processor 25. In an alternative embodiment, the lighting devices 11 and 12 comprise multiple processors. The processor 25 of the lighting devices 11 and 12 may be a general-purpose processor or an application-specific processor. The light source 29 may comprise one or more LED diodes, for example. The memory 27 may comprise one or more memory units. The memory 27 may comprise solid-state memory, for example.

In the embodiment shown in FIG. 1, a receiver and a transmitter have been combined into a transceiver 23. In an alternative embodiment, one or more separate receiver components and one or more separate transmitter components are used. In an alternative embodiment, multiple transceivers are used instead of a single transceiver. The transceiver 23 may use one or more wireless communication technologies to communicate with bridge 1, e.g. Zigbee, Thread and/or Bluetooth. The lighting devices 11 and 12 may comprise other components typical for a lighting device such as a power connector. In the embodiment of FIG. 1, the two electronic devices of the invention are lighting devices. In an alternative embodiment, the electronic devices of the invention are other types of devices, e.g. non-lighting devices which are related to the lighting system (such as wireless sensors and switches that could be used for the presence/location detection), or other non-lighting devices.

Figures 2, 3:
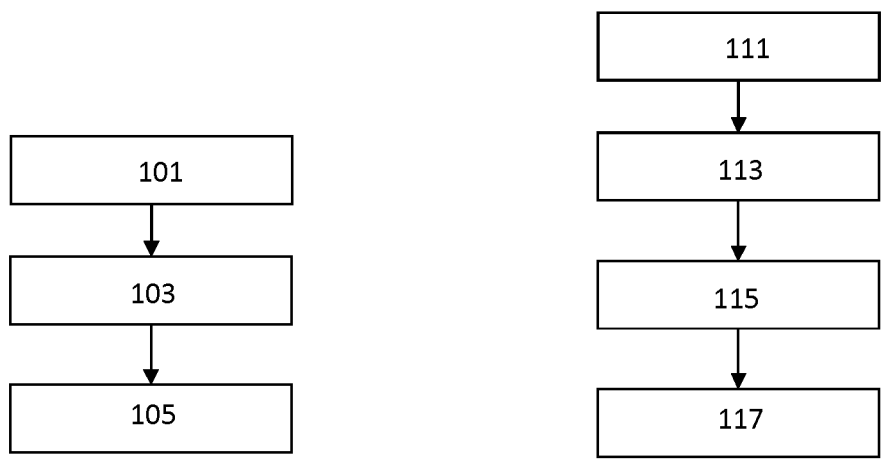
FIG. 2 is a flow diagram of a first embodiment of the first method of the invention.
FIG. 3 is a flow diagram of a first embodiment of the second method of the invention.

A first embodiment of the method of selecting one or more devices for transmitting, receiving and/or processing a radio frequency signal is shown in FIG. 2. A step 101 comprises determining a suitability of each of a plurality of devices for transmitting, receiving and/or processing a radio frequency signal for presence and/or location detection. A step 103 comprises selecting a subset of devices from the plurality of devices based on the suitability determined for each of the plurality of devices. A step 105 comprises instructing at least one of the subset of devices to act as a device for transmitting, receiving and/or processing a radio frequency signal for presence and/or location detection. Step 105 may further comprise instructing at least one of the subset of devices to transmit network messages, e.g. messages of a lighting control system (e.g. reporting of power consumption).

A first embodiment of the method of controlling message routing within a wireless (e.g. mesh) network is shown in FIG. 3. A step 111 comprises determining a first subset of the plurality of nodes. The first subset comprises one or more devices that are assigned a radio frequency-based presence and/or location detection function. A step 113 comprises determining a plurality of routes from a source node to a destination node. At least one of the plurality of routes comprises one or more intermediate nodes. A step 115 comprises selecting one of the plurality of routes based on how many of the intermediate nodes of each of the plurality of routes are part of the first subset of the plurality of nodes. A step 117 comprises transmitting one or more messages to cause the wireless mesh network to perform message routing according to the selected route. These steps may be performed in the manner previously described in relation to the bridge 1 of FIG. 1.

Figure 4:
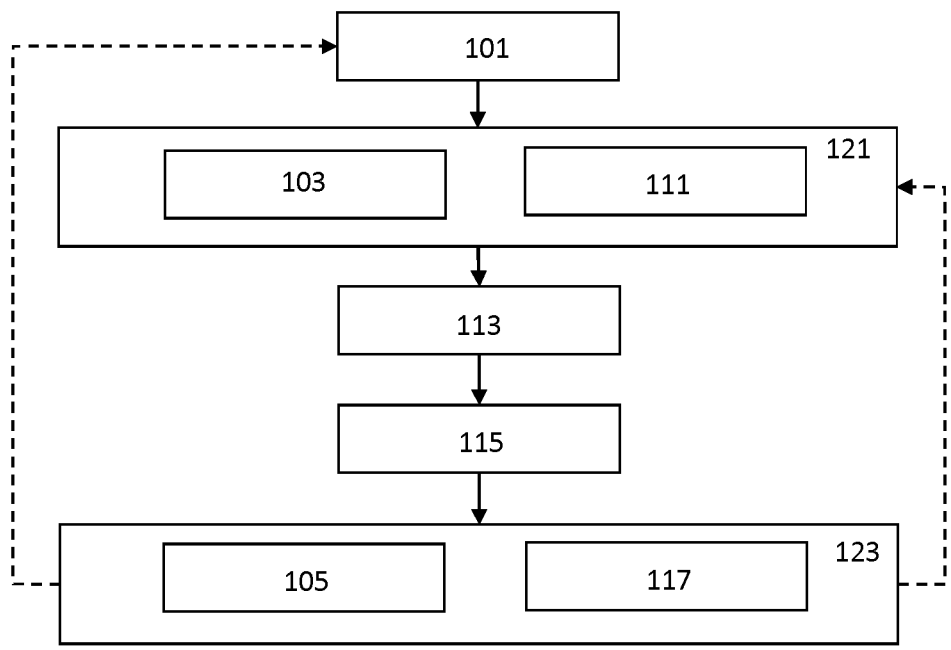
FIG. 4 is a flow diagram of second embodiments of the first and second methods.

Second embodiments of the method of selecting one or more devices for transmitting, receiving and/or processing a radio frequency signal and the method of controlling message routing is shown in FIG. 4. In this second embodiment, the methods of FIGS. 2 and 3 are combined. After step 101, a step 121 is performed which comprises both step 103 of FIG. 2 and step 111 of FIG. 3. Step 111 may be the same step as step 103 or step 111 may comprise selecting an even narrower subset of devices from the subset determined in step 103, for example. After step 121, steps 113 and 115, as shown in FIG. 3, are performed.

After step 115, a step 123 is performed, which comprises both step 105 of FIG. 2 and step 117 of FIG. 3. Step 105 may be the same as step 117, i.e. the one or more messages instruct the at least one of the subset of devices to act as a device for transmitting, receiving and/or processing a radio frequency signal for presence and/or location detection. Thus, a single message both instructing a device to perform (or not to perform) RF-based sensing or asset tracking and comprising routing instructions may be transmitted to a single device. Alternatively, step 117 may comprise transmitting different messages, e.g. to change the routing protocol of one or more network nodes. Next, after a certain time or event, step 101 or step 121 may be performed again, for example. As a first example, steps 101,121,113,115 and 117 may first be performed during commissioning and later again after commissioning and after use. As a second example, steps 101,121,113,115 and 117 may first be performed during commissioning and steps 121,113,115 and 123 may later be performed again after commissioning and after use.

Figure 5:
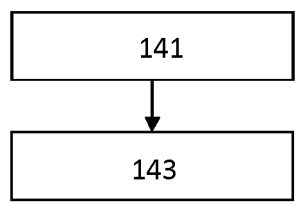
FIG. 5 is a flow diagram of a first embodiment of the third method of the invention.

A first embodiment of the method of obtaining network messages of the invention is shown in FIG. 5. A step 141 comprises using a first protocol to transmit and/or receive a radio frequency signal during a first part of each of a plurality of periods. The radio frequency signal is used for presence and/or location detection. A step 143 comprises obtaining network messages transmitted wirelessly using a second protocol during a second part of each of the plurality of periods. The second part does not overlap with the first part. A duration of the first part varies between at least two of the plurality of periods and/or a duration of the second part varies between at least two of the plurality of periods.

This method may be performed by lighting devices 11 and 12 of FIG. 1, for example. The system of the invention, e.g. bridge 1 of FIG. 1, may instruct a network node to perform the method of the invention and possibly how to perform the method of the invention. This instruction may be transmitted as part of step 123 of FIG. 4, for example. In an alternative embodiment of the system of the invention, none of the network nodes perform the method of FIG. 5.

Figure 6:
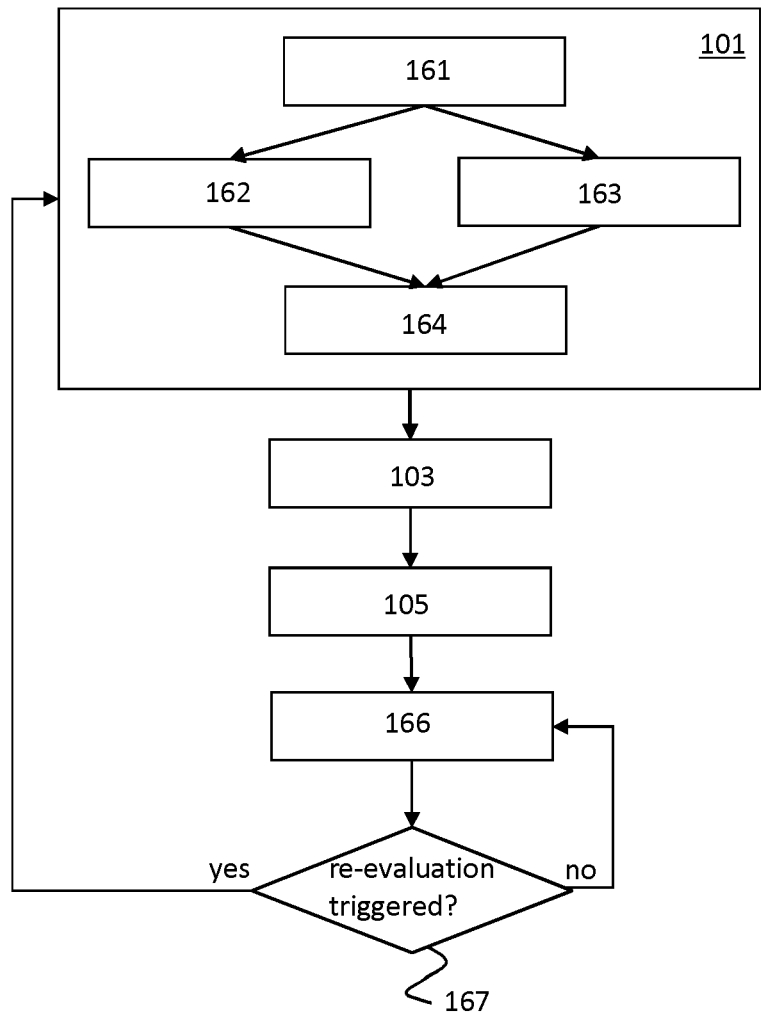
FIG. 6 is a flow diagram of a third embodiment of the first method.

A third embodiment of the method of selecting one or more devices for transmitting, receiving and/or processing a radio frequency signal is shown in FIG. 6. This third embodiment is used in an RF-based sensing (presence detection) application. In the embodiment of FIG. 6, one or more of the following criteria may be assessed to determine the suitability of each individual device in step 101 during commissioning:

Hardware-Capability Related Criteria

Participation in RF-based sensing typically requires the transmitter to send extra wireless messages and the receiver to perform RSSI (Received Signal Strength Indication) analytics and storage. This requires additional processing and memory resources and it is therefore beneficial to assess available processing and memory resources.

For instance, the first generation of Philips Hue light bulbs uses a less powerful microcontroller than the newest generation of Philips Hue light bulbs. The latter has more memory and processing resources to be able to run algorithms for RF-based sensing and store more signatures (these signatures allow the changes in RSSI to be classified, e.g. to determine the presence of a human) or run several detection algorithms in parallel (e.g. a first algorithm is lighting-grade occupancy detection with low latency, while a second algorithm is a security-grade algorithm with high confidence, which alerts the home owner that someone is present in the house while the owner is away). Two identical hue bulbs located in the same area may still have different operational use. For example, a first lamp has just one scene stored on it and therefore more free memory compared to a second lamp with 30 scenes stored on it. The number of scenes on a lamp is not a static parameter and typically changes over life of the lamp since the user/system may change it. The amount of available memory may change with software updates of the lamp.

Criteria on Luminaire Types which have Suitable RF Characteristics, e.g. Produce a Suitable Wireless Beam Shape for RF-Sensing Different luminaire shapes and RF designs lead to different RF characteristics, e.g. wireless beam shapes. For instance, a ceiling luminaire with a glass surface has a different wireless beam shape than a metal-cone table lamp. The same wireless lamp placed within a first table-top luminaire with a metal cone-shape shield will result in a narrower wireless beam pattern compared to a second table lamp with identical luminaire outline, but a fabric textile shield. It is therefore beneficial to classify the luminaires with respect to their RF characteristics, e.g. RF-based sensing characteristics. This can be done with model identifications of luminaires (e.g. "Philips Hue Beyond White luminaire") or the user uploading a photo of the luminaire in which a lamp is placed. The sensing characteristics of the luminaire may be determined by analyzing the shape and the materials or by looking them up in a database. Since the same luminare can be mounted in different environments and RF performance can depend on differences in the environment, e.g. the distance to a concrete floor above the luminaire and the presence of metal pipes above the office ceiling, it is beneficial to also measure the real RF performance after commissioning.

Interference- and Reachability-Related Criteria.

Assessing interference- and reachability-related criteria makes it possible to avoid lighting devices that are likely to suffer or have been determined (e.g. based on historical data) to suffer from wireless interference caused by non-lighting devices affecting the lighting device's ability to perform RF-based sensing. For instance, a lighting device which is located near other devices with an RF transmitter (e.g. a TV or WiFi access point) or which emit RF radiation might suffer from disturbances. For example, microwaves and power tools emit RF radiation as spurious by-product. The location of entertainment devices such as TVs with respect to Philips Hue lights may be determined based on the mapping provided by the user when setting up Philips Hue Entertainment feature, based on images captured by a camera, based on the names of the lights (e.g. "TV light"), based on a Building Information Model (BIM), or based on a 3D model of a room, for example.

Preferably, lights that are too close to each other, e.g. two lights in the same compact space, are not included in the same group (of transmitting device and one or more receiving devices). For example, if five spots can be fitted into a luminaire, it is beneficial not to pair two of them, as it is very unlikely any human would generate a detection signal between them.

Reachability refers to the link status between two devices which sometimes can communicate directly and sometimes not—e.g. due to a metal door between them being closed or open. Such links are not preferred for RF-based sensing unless the RF-based sensing is used to monitor whether the automatic fire door is closed or open (which has value to prevent the spread of a fire).

End-User Usage-Pattern Related Criteria

Assessing end-user usage-pattern related criteria makes it possible not to select a lighting device that is often transitioning between on and off (e.g. a sensor-controlled closet light) versus lighting devices which are on most of the day. The latency introduced by RF-based sensing is much more noticeable for humans when the lights transition from off to on (e.g. the user might have walked too far into a room and collided with furniture in the dark) than on to off.

Assessing end-user usage-pattern related criteria makes it possible not to select those lighting devices which a user uses most for dynamic light scenes (especially those scenes requiring low latency).

Assessing end-user usage-pattern related criteria makes it possible to select a lighting device that is more often on than off. As RF sensing would introduce some delays due to processing, an external trigger meant to set the light to on could have a noticeable delay if the light was previously off compared to if it already is on.

Criteria on Locally Available Spare Data-Rate in a Certain Local Sub-Part of the Network or Certain Device If there is insufficient headroom (i.e. the spare data-rate is low) in the network to send the additional RF signals between a controller and a paired lamp, which are required to obtain a good RF-based sensing performance, this controller is not very suitable for RF-based sensing. For instance, the Zigbee radio of the controller has to handle lots of traffic as it is talking (i.e. transmitting and/or receiving non-RF-sensing related traffic) to all lights. Transmitting non-RF-sensing related traffic may comprise transmitting light control commands or backhauling high-bandwidth sensor data from the lights, for instance a PointGrab sensor transmitting rich and highly accurate metrics to the gateway about the number of occupants in a room and additional context such as the work tasks performed in the room. Transmitting and/or receiving non-RF sensing related traffic may further comprise polling, reporting, gathering sensor data, and/or pushing data between different network sections, for example. The controller's aggregator function may lead to it having less available Tx/Rx resources, while other Zigbee nodes in the same network (and even in proximity to it) would not have these issues. Hence, for larger networks, the Zigbee radio of the controller may already be at maximum capacity and the controller may not be a good candidate for forming an RF-sensing pair with a wireless light, in particular not for transmitting RF signals for RF-based sensing; occasionally sharing aggregated RSSI data may in some circumstances be still possible. However, the controller may be a good candidate to serve as the listening part of RF-sensing pairs, i.e. to record the RSSI of messages it receives from each of the lights. Each of the lights may record the RSSI of all messages sent by the controller regardless whether the message is addressed to this specific light. However, it is not desirable to load the radio of the controller to capacity as otherwise unwanted lighting-control latency is introduced in the system (other pairs of lights may be filled to maximum wireless capacity as they are not latency critical from the application perspective).

Selection of those lamps which fulfill a critical role in the network communication path between two sub-areas of a building or building floor or to the controller (e.g. one light in the staircase is a critical router for the system to communicate with the media room upstairs) should preferably be avoided.

While a first lamp transmits, a second and third lamp can record the RSSI. Whether the second or third lamp reports out the RSSI by sharing it with the coordinator of the RF-based sensing group may depend on the choices made during commissioning of the RF-based sensing group. Not only the headroom of the first lamp is important. The second lamp may be at a certain distance from the first lamp and may have a different headroom than the first lamp. When the second lamp reports out its RSSI, also its headroom is important. It hence may be advantageous to assign the lamp with the biggest headroom as the transmitting device of the RF signal for RF-based sensing, while the other devices with less bandwidth predominantly listen to the messages and only occasionally report out aggregated RSSI data. If the RF signals used for RF-based sensing have a short duration, then the transmitting device does not need to be the device with the biggest headroom. In this case, it may be advantageous to assign the lamp with the biggest headroom as receiving device of the RF signal for RF-based sensing, as in this case, the probability is highest that the receiving device(s) is not transmitting or receiving other signals while the transmitting device is transmitting the RF signal for RF-based sensing.

If in an commercial office application, several WiFi enabled gateways are used per floor and each of them is backhauling the data from a subset of the Zigbee lights to the cloud and large amounts of RF-based sensing data are backhauled to the cloud, e.g. for advanced machine learning and analytics (e.g. people counting), then those lights connected to a gateway with the largest spare capacity for the cloud backhaul are most suitable.

Different sensing rates may be assigned to sub areas of a space (e.g. a high rate to those areas that require automatic light-on behavior while other areas in the space with light already being on have lower message rates). Typically, in RF-based sensing algorithms, each of a plurality of transmitting devices transmits an RF signal once per loop. However, it is possible to increase the sensing rate in specific areas by letting a transmitting device transmit an RF signal multiple times per loop. For example, in a normal situation, each sensing loop would get messages from nodes 1,2,3,4,5. The sensing rate may be increased in certain sub areas by changing the sensing loop to 1,2,2,2,3,4,5,5,5, where nodes 2 and 5 would be extra snappy, e.g. as they are closer to the entrance. These different sensing rates should preferably be taken into account when determining the available bandwidth in a network and on this basis assessing the suitability of a device.

Spatial Criteria

Philips Hue lamps are normally grouped per room. It is therefore known, assuming the user used some logical criteria for grouping, which room each lamp is in. However, the Hue system does not know the full-layout of the building (e.g. house) or building floor. Unlike other sensing technologies, RF-based sensing can also consider use of lamps near (rather than in) the occupancy-sensing target area (e.g. within an adjacent room) and can still successfully perform occupancy mapping of the first room. In a Philips Hue system, a typical room comprises, from a RF-based sensing perspective, many different types of luminaires due to e.g. luminaire placement, height, luminaire type etc. Often two adjacent bedrooms have the similar types of luminaires present (e.g. one ceiling light, one table light, and strips at floor height.)

Figure 7:
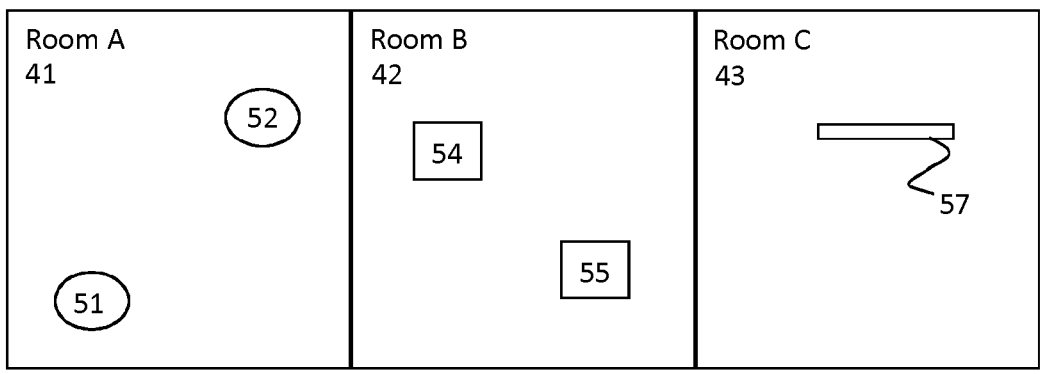
FIG. 7 depicts an example of a lighting system installed in three adjacent rooms.

For improved performance, the determining of the suitability of a device for RF-based sensing takes into account where within each room and at which relative altitude the lights are positioned. For instance, in a three-bedroom first floor of a residence, as depicted in FIG. 7, two ceiling luminaires 51 and 52 may be assigned to perform RF-based sensing for room 41 (room A), while for room 42 (room B) adjacent to room 41 (room A), the two table top lamps 54 and 55 are assigned for the RF-based sensing, and for room 43 (room C) the LED strips 57 under a couch/TV. Due to differences in placement and type of the luminaires, the recorded RF-based signatures differ significantly, such that if transmissions between the two ceiling luminaires 51 and 52 in room 41 (room A) cause the system to see a high RSSI signal in Room 41 (room A), the transmissions between the two ceiling luminaires 51 and 52 in room 41 (room A) may also cause the system to see an attenuated—but still high—RSSI in room 42 (room B).

Normally, this would have triggered a false positive in room 42 (room B), but since room 42 (room B) intentionally does not use the ceiling for RF-based sensing, but rather leverages the table top lamps 54 and 55, which have a different general shape of the luminaire and different attenuation, it is easier to identify and disregard false positives. It may be advantageous, depending on how the RF-based sensing is implemented, to not select for the RF-based sensing a ceiling and table light that are within the occupancy detection target area, but rather select a table lamp in the target area (not shown) combined with another table lamp located in the adjacent room, e.g. table top lamp 54 or 55, as the lights at same altitude will result in the optimal RF-based sensing resolution, because a table light is mostly surrounded by air while a ceiling light faces on one side a potentially RF reflecting surface formed by the concrete ceiling with its iron. In some situations, ceiling lights may be least obstructed by other objects such as office furniture and hence constitute the best location for performing RF-based sensing. If millimeter wave (Extremely High Frequency) radio technology is used, then it is important that there is a line of sight path between the lamps, because this radio technology is very directional.

Furthermore, devices far away from drainage pipes (water mass of flushing toilet water can cause false triggers), swinging trees with wet leaves and pedestrian walkways in homes that lead directly to street are preferred.

It may be beneficial to avoid luminaires which give false triggers due to people walking in the corridor outside of the room. If not possible or not desirable, a trigger from such a luminaire may be used as a first step in a two-step occupancy detection process (e.g. the first trigger is generated by a luminaire close to the corridor and this first trigger lowers the detection threshold of a luminaire which is located further within the room but still close to the first luminaire; this two-step process enables detecting of people entering the room well). Furthermore, different weights may be assigned to such a luminaire so that only a larger motion than the one needed inside the room can trigger a detection outside.

Suitability of Devices to Perform People Counting (Versus Merely Detection of Room being Occupied/Unoccupied)

People counting is not always about an accurate count, but sometimes just about distinguishing between two or a few levels of occupancy in a room. For instance, knowing whether a room is moderately busy or very busy will make it possible to proactively (instead of reactively) increase the airflow of the Heating, Ventilation and Air Conditioning (HVAC). Hence, with RF-based sensing, it is possible to get a bit more context info about a space than before. For people counting, the requirements on the RF-based sensing are higher than for mere detection whether the room is occupied/unoccupied.

Suitability of Lights to Determine the Spatial Location of Bio Mass Over Time (e.g. to Track People or Forklift with Driver in Warehouse; Large Square with a Grid of Site & Area Luminaires)

As wireless communication signals are heavily absorbed by water, RF-based sensing is a detector for the presence of bio mass (i.e. body with lots of water). Hence, for instance in a manufacturing site, RF-based sensing performed by a regular ceiling grid of WiFi equipped luminaires can track employees. In addition, large metal surfaces such as forklifts will reflect the wireless signals and hence the change caused by the presence of a forklift between two luminaires can be detected and positively linked to a forklift (rather than a human body).

Criteria Regarding Mounting Orientation

Assessing criteria regarding mounting orientation makes it possible to select devices with a mounting orientation which results in suitable RF characteristics, e.g. RF beam shapes, with respect to a target area. Some lights, such as spot luminaires, have adjustable directions. Usually, the direction of the luminaire is set once by the user during installation of the fixture and then never adjusted. For instance, a metal shaped spotlight may be turned upwards, downwards or left or right. Depending on the orientation of the spot, the directionality of the RF transmission and its propagation into the space from within the metal cone will greatly differ.

If the wireless beam is oriented to the target area, e.g. using a millimeter wave (EHF) radio or a WiFi radio with (multiple) directional antenna(s), and other RF characteristics are suitable as well, the hue lamp in the luminaire may be suited for RF-based sensing, whereas if the beam is pointing to the ceiling the same lamp may not be suitable (even if other RF characteristics are suitable). Mobile luminaires may offer the user different orientations of the luminaire (e.g. a cube-shape luminaire for decorative lighting), which result in different RF characteristics, e.g. RF-beams, depending on where the radio is at that moment located. These orientations can be easily detected internally e.g. with onboard sensors like gyroscopes or externally e.g. by the use of cameras.

Various Criteria Especially Relevant for Luminaires
  Placement of driver. Any wireless driver which is placed in/around/surrounded by metal is not preferred due to its impact on RF performance. For example, wireless drivers close to major metal things such as HVAC duct or close to metal wiring or close to structural elements such as columns and steel frames are preferably avoided. A driver in a lighting device is a circuit that mainly transforms input mains or DC voltage supply bus (e.g. 48V or high-voltage DC from solar) into a controlled voltage to get the light source(s), e.g. LEDs, to shine. A wireless driver also has a radio, such that the resulting luminaire can communicate wirelessly. Drivers do not need to be near the light source(s). For example, the light source(s) may be hanging from the ceiling, while the driver that powers the light source(s) is behind the ceiling. This can lead to different RF performance than expected.
  The type of the housing of the luminaire. A plastic luminaire housing is preferred over a perforated metal luminaire housing and a perforated metal luminaire housing is preferred over a continuous metal luminaire housing. Although metal can sometimes help in shaping RF signals, normally, the closer the driver is to free air, the better. Metal is (for RF purposes) almost the opposite of free air.
  The direction and size of the openings in the luminaire. For WiFi based RF-based sensing, a higher frequency WiFi (5 GHz) is preferably assigned to those luminaires with smaller openings in the metal.
  The direction in which the radio/luminaire is facing. Suspended office luminaires are often located right above the work desk at eye height and have often two independent light sources for up-lighting towards the ceiling and downlighting towards the task area of the desk. These two light sources may be controlled by two independent LED drivers both equipped with a wireless radio. The wireless LED driver with upward facing radio is preferred over the one with downward facing LED driver, for instance, as it is further away from the office furniture which includes many metal beams and metal surfaces leading to reflections of the wireless signals. In addition, the position of objects such as chairs may affect the absorption of wireless signal and introduce changes to the baseline signal. The wireless LED driver on the top surface of the luminaire faces upward towards a column of air and hence the wireless signal propagates in a well predictable and reproducible fashion.

In the embodiment of FIG. 6, the suitability of a device is also determined by determining a suitability per group of devices. This is performed in sub steps 161-164 of step 101. Each group comprises at least two devices, typically a transmitting device and one or more, e.g. two to four, receiving devices. Step 161 comprises selecting a plurality of groups of devices. All devices which were selected after assessing the above-mentioned criteria may potentially be included in a group. All selected devices within a certain distance of each other may be grouped. Several devices may collaborate with each other. These devices then record the RSSI of RF signals transmitted by some or all of the other devices in the same group. In this case, the RSSI of the devices in the group are assessed in order to decide whether a space is occupied or not. Thus, a group comprises 2+ devices where some or all 1:1 connections ('pairs') between those devices might be used.

More devices than immediately required may be selected. These spare devices may be selected in/for one or more detection areas where nodes are likely to be depowered, such as an area of table lights with on/off switch. For example, six devices may be employed to cooperate for the RF-based sensing instead of four devices. While this results in higher network load and higher uC load, this will ensure that the detection area still works when one or two devices, e.g. lights, are depowered (it is not known upfront which device will be depowered in the next event).

Step 162 comprises determining whether there are two groups of the plurality of groups that have a device in common and target a same or adjacent sensing area. In other words, step 162 comprises determining/picking mutually exclusive devices, e.g. luminaire, groups. If this determination is positive, one of the two groups is determined not to be suitable. One disadvantage of RF-based sensing is that a person is in room A near the wall to room B causes wireless disturbance also in room B. Hence, in prior art RF-based sensing the confidence for allocating the user to the correct one of the two rooms suffers.

When performing RF-based sensing for the entire house or (part of) a building (=not just one single target detection area, but multiple target detection areas), it is beneficial to assign the RF-based sensing function in a way so that the two groups of lights used for RF-based sensing in adjacent rooms are mutually exclusive groups (i.e. one light can only be part in one of the two adjacent RF-based sensing group). Picking mutually exclusive luminaire groups ensures that the RF-based sensing signals of the two different groups of lights look as different as possible. This reduces the likelihood that a poor detection in room A gets "stolen" by room B and hence reduces ambiguity and false occupancy detection positives.

The same principle may be used when groups comprise more than two lights, e.g. one transmitting light and multiple receiving lights. The same light should not be the controller performing all the RF-based sensing algorithmic processing for multiple groups in order to better share the load. However, a non-controller node, which (a) records the RSSI of the messages it hears and (b) reports out the RSSI, may participate concurrently in two different groups. In this case it not just reports out the RSSI of RF signals received by the first group of lights but also the RSSI of the second group of lights.

Step 163 comprises determining whether a communication quality between a pair of the plurality of devices is below a certain threshold. If this determination is positive, this pair is determined not to be suitable. The communication quality typically depends on whether there are obstacles blocking the RF-based sensing path. RF-based sensing methods do not necessarily require direct line of sight between the devices. However, wireless signals cannot see through certain obstacles. For instance, if the end-user re-arranges a large of piece of metal furniture (e.g. bookshelf), the RF-sensing path between the devices may be compromised.

The communication quality may be considered to be below the certain threshold when a change in the static signal path has resulted in a broken detection path between the pair of devices, e.g. lamps 1 and lamp 2. To detect a broken RF-based sensing path, the system may compare a current RF signature of a room with an RF signature of that room somewhere late at night (e.g. 2 am) when it is very likely that there is no contribution from people present in the detection area or when it is known that all occupants are out of home.

The communication quality may be below the certain threshold even when normally, devices are able to communication with each other. If the signal is weak, a potential temporary obstruction such as provided by a human body in the way would then mean that the path effectively breaks temporarily. It is therefore beneficial to measure/estimate the communication quality while taking into account the worst-case scenario, which would also include the obstruction provided by a human body. In step 164, the devices of the remaining (i.e. suitable) groups are determined to be suitable. Step 162 may be performed during commissioning and after commissioning and step 163 may be performed after commissioning, for example.

After steps 101, 103 and 105 have been performed during commissioning, the normal operation of the system may start, i.e. RF-based presence and/or location detection may be performed in step 166 by the at least one device instructed in step 105. In step 167, it is checked whether a certain time has passed and/or another criterium has been met and therefore the suitability of the devices needs to be re-evaluated (i.e. after commissioning). If not, then RF-based presence and/or location detection may be continued in step 166. If so, then step 101 may be performed again.

For example, it may be checked in step 167 whether the weather has (significantly) changed. For instance, if RF-based sensing is applied in the exterior garden lighting (e.g. for people counting) and the system knows there is snow falling now, which may influence the transmission of wireless signals, it may be beneficial to select different lights for the RF-based sensing. During fair weather, the mains powered light mounted on the wall of the house 5 meters away from the garden door may be used to do RF-based sensing. During snowfall, the battery operated garden light which is located right next to the garden door may be used to do RF-based sensing. Similar, fog or rain are known to attenuate wireless signals.

The suitability of the devices may also be re-evaluated when the RF-based sensing mode is switched, e.g. between people counting, people locating, detecting human entrance into an empty room, and security. For example, people counting is not a time critical feature. It is normally perfectly acceptable to spend e.g. 10-30 seconds to conclude that there are three persons in a room. Based on certain selection criteria, it might be concluded at a first moment that luminaires 1,2,3,4 are the best for lighting control as they are the ones that provide immediate detection when people enter the room. However, the system can be configured in layers, such that the application's goal is first to determine if there's someone in the room (to switch on the lights) and only later to count how many people there are.

As such, the easiest way is to have the system constantly running in motion sensing mode as that leads to the lowest latency. Once there is certainty that there is at least one person in the room, the system can automatically switch over to people counting mode, as that provides the richest information. However, perhaps lights 1,2,3,4 are not the ideal ones for people counting as e.g. they are not in the center of the room but close to the entrance. The system can then select luminaires to e.g. 3,4,5,6,7 for RF-based sensing, as they are the ones optimized for people counting. The same applies to switching over between lighting control mode (e.g. during day) and security mode (at night or during weekends and holidays).

In the second iteration of step 101 (which is performed after commissioning), a further suitability of each of the plurality of devices for transmitting, receiving and/or processing the radio frequency signal is determined. In the second iteration of step 103, a further subset of devices is selected from the plurality of devices based on the further suitability determined for each of the plurality of devices. In the second iteration of step 105, at least one of the further subset of devices is instructed to act as a device for transmitting, receiving and/or processing a radio frequency signal for presence and/or location detection.

In the embodiment of FIG. 6, one or more of the following criteria may be assessed to determine the suitability of each individual device in step 101 after commissioning:
History on Network-Reachability Assessing the history on network reachability makes it possible to avoid assigning lamps with bad history on network-reachability the task of performing RF-based sensing.

A user may be more prone to switching a certain lamp off with the legacy wall switch i.e. depowering the wireless lamp and hence making it incapable of performing RF-based sensing. It is better not to use this lamp for RF-based sensing.

Certain lamps occasionally have poor reachability due to wireless interference (e.g. when the same 2.4 GHz band is used by an audio streaming system in the neighbor's apartment).

If in a mesh network the media room can only be reached by meshing via lamps 1 and 2 located in the kitchen area and lamp 1 has bad historical reachability, e.g. because the user uses the legacy wall switch often, is it best not to select lamp 2 as RF-based sensing node to avoid critical-path issues for the core lighting control commands to reach the media room unless lamp 2 is a critical light for RF-based sensing. For example, if there are no other candidates and messages to the media room are not entirely filling the network, it may still be good to select lamp 2 as RF-based sensing node. In this case, although lamp 2 is suitable as RF-based sensing device, it may be assigned to the RF-based sensing task less of its time than other devices. Lamp 2 may thus be considered suitable, but less suitable than other devices, and the degree of RF-based sensing performed by a device may depend on its degree of suitability. The time spent by lamp 2 on RF-based sensing may depend on whether it is used for streaming of light commands to accompany audio and/or video content.

Controlled by a Motion Sensor, Battery Operated Switch, or Mains Powered Zigbee Switch Assessing whether a device is controlled by a motion sensor, battery operated switch, or mains powered wireless (e.g. Zigbee) switch makes it possible to favor lights as RF-based sensing nodes which are controlled by either a motion sensor, battery operated switch, or mains powered Zigbee switch. It is less likely that these lights are switched off by a user than those lights using a legacy wall switch, which disrupts the power to the wireless lamp.

Real-Time Wireless Interference-Related Criteria

Assessing real-time wireless interference-related criteria makes it possible to avoid lamps which currently suffer from wireless interference caused by non-lighting devices and other lighting systems (and hence would affect a lamp's ability to perform RF-based sensing), while in the same location but at a later time assessment of this criterion might result in them being considered valid candidates to perform RF-based sensing A lamp, which is located near other radio-equipped consumer electronics devices (e.g. a TV or WiFi access point), will suffer from disturbances as soon as the consumer electronics device is switched on, or video streaming over WiFi starts. However, when the TV is off, the lamps close to the TV will not suffer from interference and hence the lamps are fine candidates to perform RF-based sensing. The location of entertainment devices such as TVs with respect to Philips Hue lights may be determined based on the mapping provided by the user when setting up the Philips Hue Entertainment feature. The real-time status of the TV (on vs. off) may be retrieved by the Philips Hue system via an API of the TV or an API of a home automation system (e.g. Apple Homekit/Apple TV or Google Home), for example.

Additionally, interference may originate from another lighting system. For instance, a lamp located in proximity to the neighbors' living room may suffer from wireless interference from the neighbors' mesh lighting network which may for instance be operating on the same Zigbee channel, or occasional periods of video streaming over WiFi to his TV such as used by e.g. ChromeCast.

End-User Usage-Pattern Related Criteria

Assessing end-user usage-pattern related criteria makes it possible not to select the lamp that is known by the system to often transition between on and off (e.g. a sensor-equipped walk-in-closet light which requires instant switching on of the light) versus a light in the staircase which is most of the day on (or even an emergency light which is always on). The latency introduced by RF sensing is much more noticeable for humans when the lights transition from off to on (e.g. the user might then walk too far into a room and collide with furniture in the dark).

Assessing end-user usage-pattern related criteria makes it possible not to select those lamps for RF based sensing which a user uses most for lighting dynamic scenes (especially those lamps participating in scenes requiring low latency).

Criteria on Current Freely Available Data-Rate within the Overall Wireless Network In a large Zigbee network comprising hundreds of lights, the traffic caused by the Zigbee router devices sending their link status every 15 seconds may already consume 15% of the total Zigbee airtime budget. Typically, this immediately leads for large-scale networks to a shortage of bandwidth whenever the system has to perform a new temporary task on top of the normal basic system tasks (e.g. OTAU firmware update, running a dynamic tunable white lighting scene, high-resolution RF-based sensing, entertainment streaming). Hence, in a large-scale network, less devices may be selected for RF-based sensing roles and suitability requirements are preferably applied stricter and based on accurate information. For smaller networks (e.g. a network comprising 30 wireless lights), more airtime headroom is available for the lights performing additional tasks such as RF-based sensing.

Currently Available Free Airtime within the Zigbee Network

Which group of lamps is the optimal choice for the RF-based sensing normally depends on the currently available free airtime within the Zigbee network. Participation in RF-based sensing typically requires the transmitter to send extra wireless messages or other signals and the receiver to determine the RSSI and other network diagnostic parameters and then perform RSSI (Received Signal Strength Indication) analytics and storage. For instance, a link between lamps A and B best may give best occupancy detection results only at highest data rates (e.g. Philips Hue entertainment mode is running). If only a low bandwidth is available between the lamps (e.g. due to crowded spectrum), a link between lamps B and C may be best suited to perform the occupancy sensing.

Typically, links between a single transmitting device and multiple receiving devices are assessed for RF-based sensing. Typically, an RF-based sensing group comprises three to five lamps sending messages and determining the RSSI of received messages from the other lamps. One of the lamps may be assigned to do the processing of the occupancy detection algorithms, while the other lamps just send messages and report out the RSSIs to the one lamp doing the presence detection processing algorithm.

Forecasted Free-Airtime within the Zigbee Network

By forecasting the free-airtime within the Zigbee network (based on context), it is possible to proactively adjust the selection of lamps to perform the RF-based sensing. Often, a lighting system knows upfront that additional network loading will be coming up due to situations such as (1) a specific schedule (e.g. dynamic scene scheduled at 8 pm) (2) sensed parameters which are known from history to subsequently cause some peak loading (e.g. a person entering the media room at 08:30 likely means he will watch TV with dynamic Ambilight surround-lighting) (3) a schedule software update cycle (OTAU). In these cases, it is beneficial to proactively adjust the selection of lamps performing the RF-based sensing accordingly.

For example, the lighting system predicts that entertainment lighting scene will soon be activated in the media room. The system knows that the light in the staircase will become a critical Zigbee router for the controller/bridge to communicate with the entertainment lighting in the media room upstairs. The system hence does not select this lamp as RF-based sensing node or does not select this lamp for transmitting additional RF signals specific to RF-based sensing and/or for performing processing specific to RF-based sensing.

Selection of those lamps which fulfill a critical role in the network communication path between two sub-areas of a building or building floor or to the controller (e.g. one light in the staircase is a critical router for the system to communicate with the media room upstairs) should preferably be avoided as well. In special circumstances, the light in the staircase may already have determined a communication pattern from its lighting-controls related messages which is frequent and well distributed over time, making this lamp suited for RF-based sensing without the need to add RF-based-sensing-specific extra messages or signals.

Possibility of Modifying Parameters or Delaying Actions

Devices of which the parameters or actions can be modified/delayed are preferred, because this may ensure that there is a near-perfect RF-based sensing. For instance, when performing an OTAU of a light's firmware, the lighting system is preferably able to adapt the OTAU speed in such a manner to leave sufficient bandwidth to execute the currently required RF-based sensing mode for each of the occupancy-detection target areas. Alternatively, the timing of reporting of non-latency-critical parameters such as energy consumption and temperature may be modified to maximize the RF-based sensing performance.

Amount of Free Processing Power Currently Available

Assessing the currently available processing resources of devices makes it possible to selects lamps which have sufficient amount of free processing power currently available to ensure fast processing of the RF-based sensing data and detection algorithms; several detection algorithms may run in parallel, for instance a lighting-class detection algorithm with low latency and a security-class algorithm for detecting intruders in a vacant home with very high detection reliability but higher latency.

For example, if the processing time of the RF-based sensing signals exceeds 0.2 seconds, the latency of the lighting controls may be unacceptable for the end-user (especially in cases the lights had been off and need to be activated based on the occupancy sensing). Two identical hue bulbs located in the same area may still have different operational use. e.g. a first lamp has just one scene stored on it and therefore has more free memory compared to a second lamp with 30 scenes stored. The number of scenes on a lamp is not a static parameter and may change over life of the system. Also, the available free processing power will vary from lamp to lamp, for instance a lamp running a complex light effect with a built-in microwave sensor will have less free CPU resources than a static lamp.

In a Philips Hue system, some bulbs act as Zigbee parent node for Zigbee end-nodes. Being a parent node consumes additional resources (e.g. processing, data storage, regular radio contact with end-node) compared to non-parent bulbs. Typical Zigbee end-nodes are battery-operated devices such as wall-switches and sensors or battery-operated lights. The Zigbee end-nodes dynamically choose their parent based on the best wireless link. Hence, the parent device of the Zigbee end-node may change several times over life. Hence, assigning a Zigbee parent-device and a Zigbee end-device to a single RF-based sensing group may not be advantageous. In addition, RF-based sensing typically requires additional RF signals and/or processing and hence will shorten the battery life of a Zigbee end device.

If RF-based sensing is used for multiple applications, e.g. security and light control, multiple algorithms typically need to be performed. Although it would be ideal if one device could process both algorithms, a device may also be considered suitable if it is able to perform one of the multiple algorithms. In this way, the responsibility may be split such that all the devices which would be suitable in view of other criteria are not ignored, but the available processing power criteria gets split among multiple nodes instead of an all or nothing approach. This may be used when algorithms are "stacked", e.g. determining quickly that there is motion is algorithm A, but taking a deeper look and concluding presence with a much higher degree of confidence at the expense of higher latency is algorithm B. An application might want to get both results out, but due to this stacking a situation could be reached where a node is suitable for running either A or B, but not both.

On/Off Status of the Lights

By assessing the on/off status of the lights, it is possible to optimize the stand-by power of the lighting system during RF-based sensing. Typically, a device needs somewhat more power during transmission than reception (which is the idle state of a router lamp device, independent of whether the light is on or off). Hence, transmitting heavy wireless traffic for RF-based sensing while the light is "off" might increase the consumed power (which could be considered "standby power" because the light is off). To meet potential future more stringent standby regulations, it may be advantageous to predominantly select lights to perform RF-based sensing which are currently on, i.e. emitting light (if possible).

Current Thermal Stability

By assessing the current thermal stability of lamps, it is possible to select lamps which are currently thermally stable to perform RF-based sensing. A lamp's temperature might drift when the operational state is changed between lights on/lights off. This results in temperature drift of the radio electronics, which results in drifting of the wireless transceiver characteristics (e.g. receiver sensitivity). Selecting thermally "stable" lamps will hence result in smaller offsets between radios than utilizing a light that has just transitioned between lights-off and lights-on. In the case of lamps which are more thermally unstable, these drifts/offsets could fool the system to believe that the dynamic characteristics of the environment have changed, potentially leading it to conclude that there has been motion (this being a false positive).

Exposure to Daylight

During the day, certain lights will never be switched on as sufficient natural light is available in their specific area. These lights are excellent candidates for RF-based sensing, as they are not expected to be switched on by the user and hence—despite of the lamps being off—do not require low latency to lighting controls commands. If these lamps do get turned on, the amount of daylight already present would help mask the effect of potential latency issues when compared to another previously dark room transitioning to on. It is therefore beneficial to select lamps with a high exposure to daylight. However, while some lights may be excellent RF-based sensing nodes during the daytime, they may be a poor choice during night time (e.g. low latency control required for this space). Lights which are always on (e.g. used in corridors without windows or in areas of a building where there is always someone during office hours) are also good candidates. Generally, lights which do not switch from OFF to ON a lot or are good candidates if latency is a concern.

Lighting Command Transmission Activity

By assessing the lighting command transmission activity, it is possible to assign lamps which are currently less active in sending lighting controls commands to be more active in taking care of the listening- and processing- and storing associated with the RF-based sensing. Highly interactive lamps e.g. lights in an (active) entertainment group, should not be assigned to perform basic chores for RF-based sensing that can be allocated elsewhere in the system. For instance, the lights in the entertainment group (which render light to accompany audio and/or video content) create (or receive) a lot of traffic, which is good for RF sensing, but they should primarily be focused on providing perfect lighting experience to the user. One option is to assign a light which is part of an entertainment group to perform RF-based sensing, but to let the data storage and CPU intensive data analytics processing being done by a light which is not part of the entertainment group. For example, the device that transmits the entertainment light commands may be the transmitting device in multiple RF-based sensing groups. The other device(s) in these groups may be lights inside or outside the entertainment group, for example.

Criteria on Currently Available Spare Network Data-Rate

By assessing the currently available spare network data-rate, it becomes possible to select devices with sufficient currently available spare network data-rate. For instance, a Zigbee radio within a controller/bridge may be currently performing a OTAU firmware upgrade of the lamp in the kitchen. Combined with the normal lighting control traffic with the other lights in the house, the radio in the controller/bridge currently handles a lot of wireless traffic. Hence, the Zigbee radio residing within the controller/bridge may already be at capacity and may not be a good candidate right now for forming an RF-sensing group with the wireless light in the living room (until the firmware update of the kitchen light has finished). One option is to assign the controller/bridge to still participate in the RF-based sensing, but to let the data storage and CPU intensive data analytics processing being done by a light which is not part of the OTAU upgrade and hence has ample of free computing power and memory.

RF Characteristics, e.g. Beam Shapes, with Respect to the Occupancy Detection Target Area.

By assessing the RF characteristics, e.g. beam shapes, with respect to the occupancy detection target area, it is possible to select luminaires of which the current physical position results in suitable RF characteristics, e.g. beam shapes, with respect to the occupancy detection target area. For instance, a cube-shaped battery-operated luminaire (similar to a Hue Go) may have six different faces and the user may be able to select the orientation of the cube. If the face containing the radio chip, e.g. WiFi radio chip or 60 GHz mm-wave radio chip, is at that moment oriented towards the target detection area, it makes the cube luminaire well suited for RF-based sensing. If the radio is facing the floor, the luminaire is not well suited to perform RF-based sensing.

The suitability of a luminaire positioned in a certain orientation may also depend on other material in its surrounding. For instance, if it is on a metal table, the cube being oriented downwards will yield poor results for RF-based sensing, while if the table is made from thin wood, the RF-based sensing still can be performed satisfactorily. If a radio chip is incorporated into a light bulb and this light bulb is placed in a metal luminaire, this may result in directed RF performance as well, even if the RF performance of the radio chip itself, e.g. a Zigbee radio chip, is uniform.

On these last few pages, a first set of criteria has been described for use during commissioning and a second set of criteria has been described for use after commissioning. Some criteria are present in both sets. Although some other criteria are only present in one of the sets, they may be usable both during commissioning and after commissioning. Criteria that have been described in relation to RF-based sensing (motion detection or true presence detection or fine-grained sensing capable of detecting body postures or gestures) may also be usable for RF-based asset tracking (localization).

While the selection criteria above are used to avoid certain lamps to perform RF-based sensing in the embodiment of FIG. 6, it is also possible to throttle the RF-based sensing on purpose to mitigate the negative system impact of the RF-based sensing described above. In the extreme case, the RF based sensing can be throttled to the extent that just the non-sensing related messages sent within the Zigbee network are used.

Figure 8:
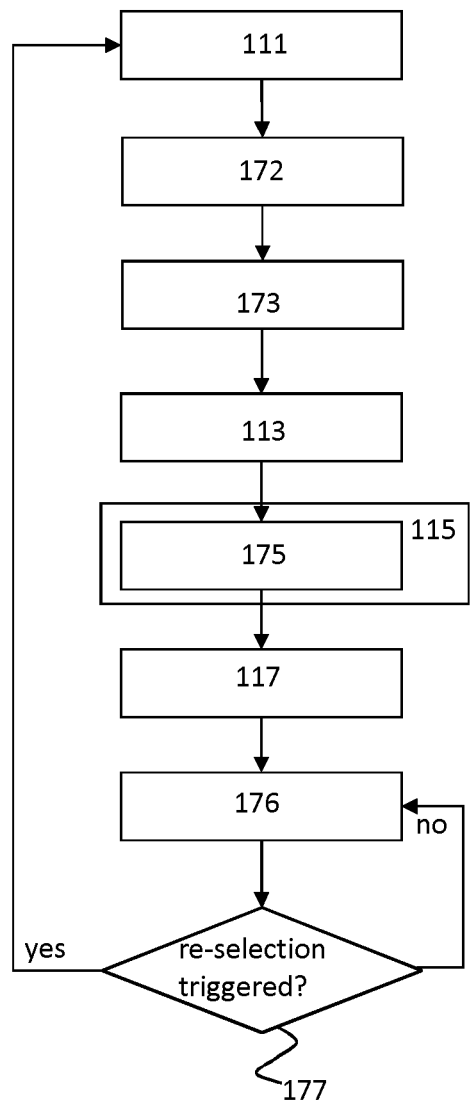
FIG. 8 is a flow diagram of a third embodiment of the second method.

A third embodiment of the method of controlling message routing within a wireless, e.g. mesh, network is shown in FIG. 8. As described in relation to FIG. 3, the aim of this method is to determine which nodes to instruct to perform network routing, i.e. forward the messages that they receive. These instructions result in the network routing being adjusted and the wireless spectrum being freed up locally for the execution of RF-based sensing and/or asset tracking and have been described in more detail in relation to the bridge 1 of FIG. 1.

As previously described, step 111 comprises determining a first subset of the plurality of nodes and this first subset will comprises one or more devices that are assigned a radio frequency-based presence and/or location detection function. This first subset may be selected manually or automatically.

The first subset may be selected from all nodes or from nodes that are determined to be suitable for RF-based presence detection and/or localization as described in relation to FIGS. 2 and 4, for example. If the one or more nodes of the first subset need to perform RF-based localization (RF-based asset tracking), then selecting one node may be sufficient. If the one or more nodes of the first subset need to perform RF-based presence detection (RF-based sensing), which is more difficult to perform than RF-based asset tracking and in which the to be detected objects, persons or animals do not carry RF transmitters and/or receivers, then typically at least one group of at least two nodes is required and these nodes are then typically selected based on the of one or more target sensing areas.

Next, a second subset of the plurality of nodes is selected based on the locations of the one or more nodes of the first subset in step 172. While the one or more nodes of the first subset will transmit and/or receive one or more radio frequency signals for the radio frequency-based presence and/or location detection function, the one or more nodes of the second subset will not. Instead, the one or more nodes of the second subset will try to limit the interference caused to the RF-based presence and/or location detection by not re-transmitting some network messages or any network messages, e.g. lighting control commands, intended for other nodes (in this embodiment, the sensing and/or asset tracking RF signals are transmitted in-band). The one or more nodes of the second subset might receive the RF signals for RF-based presence and/or location detection, but do not need to and/or do not need to record their RSSI. A node of the second subset may be included in the second subset instead of the first subset due to it not being in a suitable location or not adding additional information beyond what is already possible with the other nodes. Next, step 173 comprises creating a third subset of nodes that consists of the remaining nodes of the plurality of nodes (i.e. not selected as part of the first subset or the second subset). Unlike the one or more nodes of the second subset, the one or more nodes of the third subset re-transmit all network messages intended for other nodes, i.e. perform the normal routing function.

As previously described in relation to FIG. 3, step 113 comprises determining a plurality of routes from a source node to a destination node. Step 115 of FIG. 3 comprises a sub step 175. Step 175 comprises selecting one of the plurality of routes based on how many of the intermediate nodes of each of the plurality of routes are part of the first subset or the second subset of the plurality of nodes. Step 117 comprises transmitting one or more messages to cause the wireless (e.g. mesh) network to perform message routing according to the selected route. This has been described in more detail in relation to the bridge 1 of FIG. 1.

In step 117, these one or more messages are normally transmitted using a different protocol (e.g. Zigbee) than the protocol (e.g. Bluetooth) used to perform the RF-based presence detection and/or localization. In the embodiment of FIG. 8, the one or more nodes of the first subset and the one or more nodes of the second subset are instructed not to perform message routing (e.g. for lighting control commands or regular network "housekeeping" messages) or to limit the message routing that they perform. Furthermore, the one or more nodes of the first subset are instructed to perform RF-based presence and/or location detection. The nodes of the second subset are instructed to interfere with the nodes of the first subset as little as possible. The nodes of the third subset are instructed to perform network routing, i.e. forward the messages that they receive that are intended for other nodes.

These instructions result in the network routing being adjusted and the wireless spectrum being freed up locally for the execution of RF-based sensing and/or asset tracking. The one or more nodes of the first subset and the one or more nodes of the second subset may be instructed to act as (e.g. Zigbee) router nodes with reduced functionality (also referred to as mode 2 later in this description), which means that the nodes listen on the Zigbee mesh network for messages directly addressed to them, but the nodes do not forward messages from other Zigbee nodes.

Alternatively, the one or more nodes of the first subset and the one or more nodes of the second subset may be instructed to act as (e.g. Zigbee) end-nodes (also referred to as mode 3 later in this description), which do not participate in the mesh network at all but only check every certain period (e.g. 0.5 seconds or longer) for messages destined for this node received and temporarily stored by their parent node(s). Alternatively, the one or more nodes of the first subset may be instructed to act as router nodes with reduced functionality, while the one or more nodes of the second subset are instructed to act as end-nodes, or the other way around, for example. The nodes of the third subset act as full-fledged (e.g. Zigbee) meshing nodes (also referred to as mode 1 later in this description), thereby providing the backbone for a robust building-level, e.g. mesh, network.

In the embodiment of FIG. 8 or in an alternative embodiment, the one or more nodes of the first subset that need to transmit an RF signal for RF-based sensing may be instructed to transmit the RF signal during a certain period without interruption, e.g. transmitting the RF signal full blast without caring about being reachable by other nodes, and the nodes of the first subset that need to receive the RF signal for RF-based sensing may be instructed to receive the RF signal during this certain period without interruption. This is referred to as "high-spatial-resolution" sensing mode. If these nodes of the first subset are lighting devices, then this mode may be selected for the certain period or the certain period itself may be selected in dependence on an expectation that the light devices are expected to stay unchanged in light output state during this certain period.

After steps 111, 172, 173, 113, 115 and 117 have been performed during commissioning, the normal operation of the system may start, i.e. RF-based presence and/or location detection and/or network routing may be performed in step 176 by the devices instructed in step 117. In step 177, it is checked whether a certain time has passed and/or another criterium has been met and the first and second subsets need to be re-selected. If not, then RF-based presence and/or location detection may be continued in step 176. If so, then step 111 may be performed again and a new selection of one or more nodes of the first subset and one or more nodes of the second subset is performed.

The first and second subsets may need to be reselected when the target sensing area used for RF-based sensing (presence detection) changes. Step 177 may comprise detecting whether user activity has changed or is expected to change and therefore presence needs to be detected in a different target sensing area. For example, the routing in the network may be dynamically adjusted when a target person moves from first area in the house to a second area. The person thus takes as high-intensity-RF-based-sensing "halo" with him to the new area. In other words, the (e.g. lighting) system adjusts the routing to now free up wireless spectrum for RF-based sensing for the second area, while "releasing" additional spectrum for lighting controls in the first area. Additionally, as wireless signals may propagate between the first and second area, this approach assures that the first and second area do not unnecessarily interfere with each other.

Two examples of routes being determined between the devices of FIG. 1 are now provided to help explain the method of FIG. 8. As a first example, the table lamp 15 and the floor-standing lamp 14 in the living room 32 are performing a high-resolution RF-based sensing scan to count the number of occupants for context-awareness purposes. At the same time, the LED strips 12 are used in the media room 33 to perform a dynamic entertainment effect requiring considerable (e.g. Zigbee) traffic between the bridge 1 (located in the entrance area 34) and the media room 33. The distance between the hue bridge 1 in the entrance area 34 and the media room 33 is such that the (e.g. Zigbee) communication requires at least one network hop in between the two rooms.

By adjusting the routing in the network such that the table lamp 15 and the floor-standing lamp 14 do not participate in the forwarding of the entertainment messages from the bridge 1 to the LED strips 12, the table lamp 15 and the floor-standing lamp 14 are able to focus their processing resources and/or message transmissions and/or listening for wireless commands (Zigbee devices typically cannot talk and listen at same time) on performing the high-resolution RF-based sensing. The table lamp 15 and the floor-standing lamp 14 may become a Zigbee end-node or a Zigbee router node with reduced functionality, for example. It is also possible that only the node assigned to predominantly listen for RF-based sensing purposes is assigned to become a Zigbee end-node and that this node only reports out the RSSI statistics when contacted by the Zigbee parent device.

On the other hand, the ceiling lamp 13 in the Kid's bedroom 35 steps up and provides the routing for the entertainment traffic to the media room 33. In addition, even the battery-operated Hue go luminaire 11, normally acting as (e.g. Zigbee) end device, may be utilized as routing node (despite of increased energy consumption) in order to keep traffic away from the living room 32 in which the high-resolution RF-based sensing scan is performed. There are two logical routes between bridge 1 and the LED strips 12: via the Hue go luminaire 11 and the ceiling lamp 13 or via the floor-standing lamp 14. Since the floor-standing lamp 14 is involved in the high-resolution RF-based sensing scan, the route via the Hue go luminaire 11 and the ceiling lamp 13 is selected, even though a typical routing algorithm might select the route via floor-standing lamp 14 since this involves fewer hops.

As a second example, the table lamp 15 and the LED strips 12 are performing a high-resolution RF-based sensing scan in the media room 33 and a network route from bridge 1 to LED strips 12 needs to be determined. There are nine routes between bridge 1 and LED strips 12: 1-14-12, 1-14-13-12, 1-14-15-12, 1-11-13-12, 1-11-13-14-12, 1-11-13-14-15-12, 1-11-14-12, 1-11-14-13-12 and 1-11-14-15-12. Lighting device 15 has been assigned the RF-based sensing function and is therefore included in the first subset of nodes. In order to prevent interference to the high-resolution RF-based sensing scan, floor-standing lamp 14 should preferably not perform network message routing and is therefore included in the second subset of nodes Since the table lamp 15 has been included in the first subset and the floor-standing lamp 14 has been included in the second subset, the route via the Hue go luminaire 11 and the ceiling lamp 13 (1-11-13-12) is selected.

In the above examples, the determination of the first subset only takes into account whether nodes are assigned an RF-based sensing function or not. By further taking into account the resolution of the RF-based sensing scan (e.g. major motion detection vs. minor motion detection vs. true presence detection vs. people counting), as currently required, when determining the first subset, the selected routes can be adapted to the current requirements even better. High-bandwidth RF-based sensing will be required for minor motion detection so that the sensing algorithm can with confidence determine whether the variation of wireless communication parameters with respect to a previous threshold/baseline are due to wireless channel noise or due to a person typing on a laptop while hardly moving otherwise.

Fine grained RF-based sensing cannot only detect presence, but also distinguish between number of people present (or relative amount of people—one, several, a lot). For fine-grained RF-based sensing, there is a tradeoff between the quantity of messages sent per second and the latency for determining with confidence whether the space is occupied or how many people are in there. It is therefore beneficial to adjust the amount of messages based on the combination of the required latency for the decision making and the required confidence level (e.g. for security class detection of an intruder including alerting the home owner, the confidence level needs to be much higher than for switching on the light; in the latter case, having a false positive can easily be corrected by switching off the light again with no harm done).

True presence detection is an even finer grained version of the RF-based basic motion sensing, where the resolution is increased so that even people sitting in a chair or stretched out on the couch can be picked up by analyzing the variation of communication parameters compared to the previously known empty room situation. Hence, the higher the required sensing resolution, the higher the data rate of the RF-based sensing related communication between the lights will be and the higher the strain on the network surrounding the target occupancy detection area.

RF-based sensing can also be used for people counting. Being able to distinguish between 10 people in an area will require higher resolution RF-based sensing than counting a maximum of 3 people per area. A "counting-many-occupants"-mode could be optimized for distinguishing between 10-20-30 people whereas in a "normal-mode", RF-based sensing could distinguish with high accuracy between 1-2-3 people in the room.

The previously mentioned "high-spatial-resolution" sensing scan may be used to determine with high confidence whether a person is in room A or B. The "high-spatial-resolution" sensing mode may also be used for tracking trajectories of people. During performing a high-spatial resolution or many-occupants RF-sensing scan, the group of lights may enter a special "sensing-boost mode" in which 100% of their bandwidth is dedicated to the acquisition of RF-based sensing data. This may involve the lights temporarily not being reachable by the other lights in the Zigbee network, or with longer latency. The network routing may be temporarily adjusted to facilitate this "high-spatial-resolution" sensing scan or any other high-resolution scan e.g. for people counting.

Preferably, the sensing-boost-mode, as described in the previous paragraph, is performed by lights which are on and/or are in stable mode. Stable mode means that the lights are expected to stay in unchanged light output state for the foreseeable future. For instance, a light is in stable mode when a battery-operated sensor has recently detected motion, which means the light will remain on at least another five minutes (irrespective of whether motion is detected in that period) and a 4 minutes duration of the boost mode would be acceptable from a lighting controls perspective.

If the lights are currently off (e.g. in an unoccupied home), the lights may be switched on for safety reasons for the duration of the high-resolution sensing mode, for instance in the entrance area of the house. In an office, the RF-based sensing may be used for soft security during the night where once every 15 minutes the office is scanned for abnormalities. The system may falsely think that the office is empty and start a high-resolution scan for possible intruders; however, in reality an employee has been taking a nap in the office in an overnighter. When the employee gets up, the lighting system must respond to wall switches within 0.5 seconds or alternatively the lights have to be on (perhaps at a low dimming level to ensure safety) while the latency-impacting high-resolution sensing scan is performed.

Optionally, the system leverages other sensing modalities within the home automation system (e.g. electronic lock, PIR sensors, Apple TV) to decide whether and how (e.g. with what delay) the RF-based-sensing halo (also referred to as target sensing area) follows a user, who is transitioning from one area of the house to another. For instance, given the context that a person watching TV is pausing Netflix and is deemed likely to go to toilet, the RF-based halo remains within the TV room and does not follow the user. If the person however goes into the kitchen and opens the fridge for more than 30 seconds to prepare a snack, the RF-based sensing halo will follow him to the kitchen. In this case, the assignment of the RF-based sensing function to devices may be performed again and network routes may be determined again. The fridge itself may be able to detect that the fridge has been opened for more than 30 seconds, for example. Alternatively, another type of presence sensing may be used to detect that the person or a person in general is in the kitchen for a longer time, which may cause the RF-based sensing halo to move to the kitchen.

RF-based sensing may not only be used to detect persons, but also to detect objects. For example, RF-based sensing may be used to detect opening of fridges and doors. This context information can be useful for elderly care, for example. This helps the gathering of key data points that may be used to detect changes in patterns that could indicate emerging health conditions.

In a Bluetooth Low Energy (BLE) mesh-based (e.g. lighting) network, it may be possible to perform RF-based sensing based on interactions between (1) a BLE-equipped electronics device which normally is not part of the lighting network and (2) a BLE light (or a combined Zigbee/BLE light).

In a Zigbee mesh-based (e.g. lighting) network, the RF-based sensing interaction between a combined Zigbee/BLE light and a BLE electronics device may be performed by out-of-band communication (BLE instead of Zigbee). In this case, the Zigbee spectrum (channel) used for lighting control is not affected by the RF-based sensing scan, as BLE's frequency-hopping spread spectrum transmissions do not interfere with Zigbee's direct-sequence spread spectrum transmissions, even though there is some overlap between the Zigbee spectrum and the BLE spectrum. However, although the (Zigbee) network traffic does not interfere with the (BLE) RF-based sensing scan, the nodes which perform the RF-based sensing scan need time to perform the (BLE) RF-based sensing scan and may not be available to receive (Zigbee) network messages during this time if the nodes feature a single radio performing time-sharing between the BLE and Zigbee network.

Wireless interference caused by non-lighting devices (e.g. TVs) affects a lamp's ability to perform RF-based sensing. To still perform reliable presence detection in a first noisy area of the house, the data rate of the RF-based sensing should normally be increased compared to a second more quiet area of the house with little wireless interference. The lamps in the first occupancy detection target area would therefore allocate more of their airtime to RF-based sensing and they would then have less time or no time (or resources such as CPU and memory) to perform networking routing. Accordingly, the network routing should preferably be adjusted to let lights in the other part of the building step up and contribute more to the lighting mesh networking canopy, i.e. help ensure that there is proper mesh network backbone for coverage everywhere.

Figure 9:
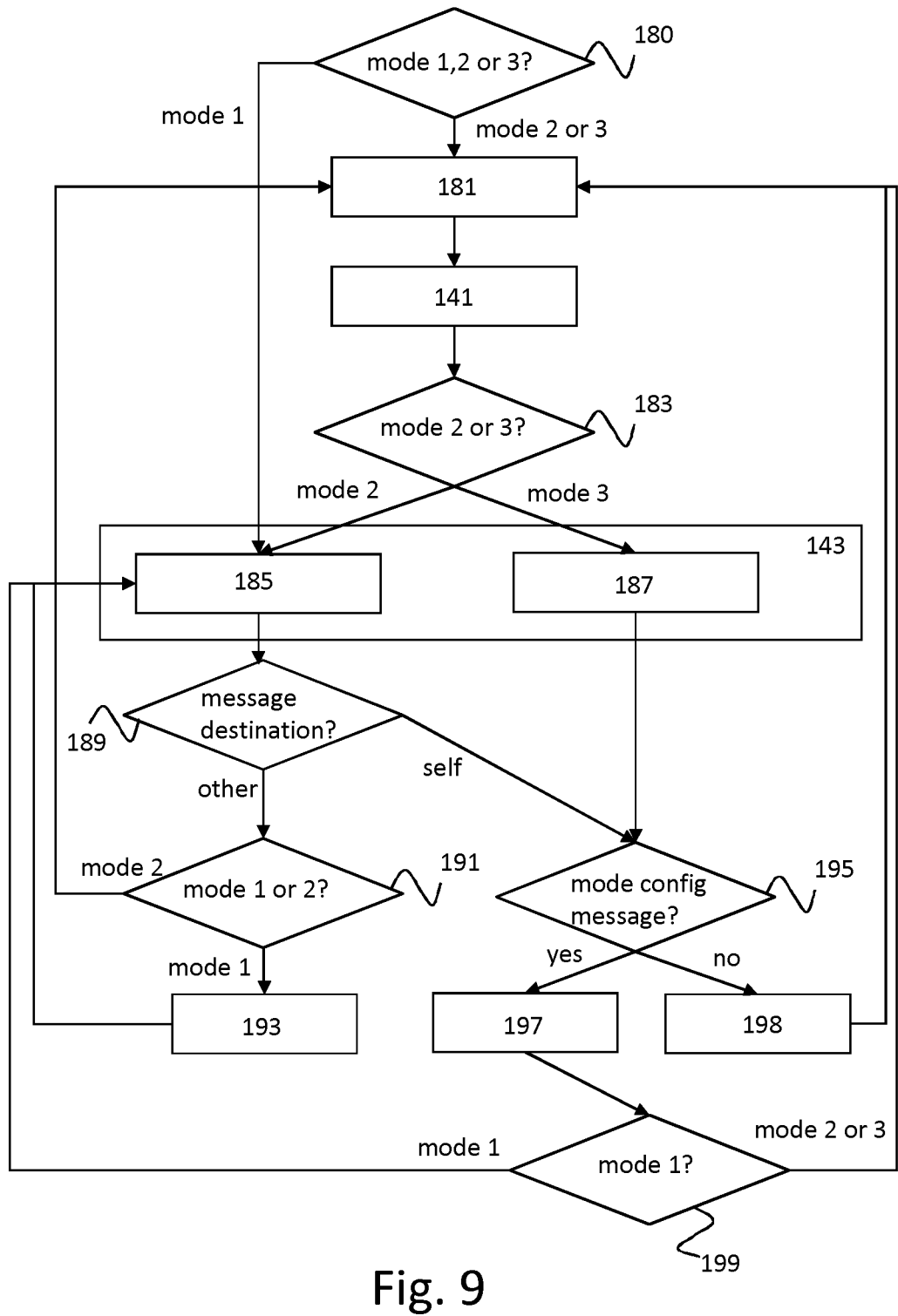
FIG. 9 is a flow diagram of a second embodiment of the third method.

A second embodiment of the method of obtaining network messages of the invention is shown in FIG. 9. In this embodiment, an electronic device uses a first portion of time for RF-based sensing and a second portion of time for transmitting and receiving network messages, e.g. lighting commands. The electronic device operates in one of the following three modes:
Mode 1) normal Zigbee router (normal mesh mode), RF-based presence and/or location detection: no;
Mode 2) Zigbee router with reduced functionality, RF-based presence and/or location detection: yes;
Mode 3) ZigBee end device, RF-based presence and/or location detection: yes.

In an alternative embodiment, only a subset of these modes may be used, e.g. modes 1+2 or mode 1+3, and/or an additional mode may be used. An example of such an additional mode is a mode in which the electronic device acts as normal Zigbee router (normal mesh mode) and also performs RF-based presence and/or location detection. When Bluetooth, e.g. BLE, is used for RF-based presence and/or location detection, this results in a loss of efficiency, because the electronic device will not receive Zigbee messages while performing RF-based presence and/or location detection.

As first step, a step 180 is performed. Step 180 comprises determining whether the electronic device performing the method is set to mode 1, 2 or 3. In the embodiment of FIG. 9, bridge 1 of FIG. 1 instructs the electronic device which mode it should use. In an alternative embodiment, the electronic device decides by itself which mode to use, e.g. automatically or using some decision algorithm involving its neighbors or based on a configuration setting stored in its memory. If the electronic device is set to mode 2 or 3, step 181 is performed. If the electronic device is set to mode 1, step 185 is performed.

Step 181 comprises selecting the first set of frequency channels. The first set of frequency channels may comprise a single channel, e.g. in case of direct sequence spread spectrum, or a plurality of channels, e.g. in case of frequency hopping. In the embodiment of FIG. 9, the first protocol, e.g. Bluetooth, is used to transmit and/or receive the radio frequency signal on this first set of frequency channels in step 141 during a first part of each of a plurality of periods. Step 183 comprises determining whether the electronic device performing the method is set to mode 2 or 3. Step 143 of FIG. 5 comprises two sub steps: steps 185 and 187. If the electronic device is set to mode 2, step 185 is performed. If the electronic device is set to mode 3, step 187 is performed.

Step 185 comprises receiving the network messages, e.g. lighting control messages, wirelessly using the second protocol, e.g. Zigbee, on the second set of frequency channels. This happens during the second part of each of the plurality of periods. The second set of frequency channels may comprise a single channel, e.g. in case of direct sequence spread spectrum, or a plurality of channels, e.g. in case of frequency hopping. If the electronic device is set to mode 1, the electronic device is able to transmit and receive network messages (e.g. lighting control messages) the entire time, as it does not need to transmit or receive an RF signal for RF-based presence and/or location detection.

In this case, the first part during which the RF signal, e.g. Bluetooth signal, is transmitted and/or received for RF-based presence and location detection has a duration of zero seconds while the electronic device remains set to mode 1 which means no RF-based presence or localization detection is performed by this device. The duration of the first part is increased, and the duration of the second part is decreased when the electronic device switches from mode 1 to mode 2 or 3. In an alternative embodiment (not shown in FIG. 9), the electronic device transmits and/or receives an RF signal, e.g. Bluetooth signal, for RF-based presence and location detection while in mode 1 (i.e. normal (Zigbee) mesh mode; in which it also forwards received messages), but only for short time intervals.

In the embodiment of FIG. 9, step 187, which is performed if the electronic device is set to mode 3, comprises obtaining the network messages transmitted wirelessly using the second protocol from another device which received the network messages on its behalf: the electronic device's parent node. Network messages obtained from the electronic device's parent node are always intended for the electronic device itself. Step 195 is performed after step 187.

After step 185, it is checked in step 189 whether the message received in step 185 is destined for the electronic device itself or for another node. If the message is destined for the electronic device itself, step 195 is performed. If the message is destined for another node, step 191 is performed. Step 191 comprises checking whether the electronic device is set to mode 1 or mode 2. In mode 1, the received message is forwarded in step 193. In mode 2, the received message is not forwarded, and step 181 is performed next. In an alternative embodiment, a received message intended for another node is selectively forwarded, i.e. sometimes, but not always forwarded, instead of never forwarded.

Step 195 comprises determining whether the message obtained in step 185 or 187 is a mode config message. If so, the electronic device is set to the mode in step 197 as instructed in this mode config message. If not, the obtained message is processed normally in step 198 and step 181 is performed after step 198. After step 197, it is checked in step 199 whether the new mode is mode 1. If so, step 185 is performed next, thereby skipping steps 181, 141 and 183. If not, step 181 is performed next.

In the next iteration of step 181, optionally, a different set of frequency channels, e.g. a third set of frequency channels, may be selected than in the previous iteration of step 181. If so, then the first protocol is used to transmit to transmit and/or receive the RF signal on this different, e.g. third, set of frequency channels in the next iteration of step 141. If the RF signal is used for RF-based sensing, then this RF signal is preferably unique within a certain spatial area. Preferably, the (e.g. Zigbee) band dedicated to RF-based sensing is locally-unique and differs for each group of devices, e.g. lamps, performing RF-based sensing within a house or building floor. Hence, each group of RF-based-sensing devices, e.g. lamps, can transmit a (e.g. Zigbee) message storm without having to take the, e.g. lighting, control network or the needs of other groups of devices, e.g. lamps, performing RF-based sensing into account. This yields optimal sensing performance.

An RF transmitter and/or receiver with more than one function, e.g. a dual radio transceiver, may be used in which one function, e.g. a BLE radio function, is used to perform step 141 and another function, e.g. a Zigbee radio function, is used to perform step 143. Alternatively, multiple transmitters and/or receivers may be used to perform steps 141 and 143, respectively.

As an example, the method of FIG. 9 may be used to perform RF-based sensing in a lighting system of a house. In this example, a dedicated Zigbee channel is used for RF-based sensing and a different Zigbee channel is used for lighting control (network messages). The lights currently assigned the task of RF-based sensing operate most of the time full-blast in Zigbee RF-based sensing mode utilizing a locally unique, dedicated wireless channel (i.e. no interference with house-level Zigbee lighting network). For a small portion of the time, the RF-based-sensing lights participate in the Zigbee lighting network.

Within the lighting network, generally, such an RF-based-sensing light may act as sleepy Zigbee end-device (operating in mode 3) or Zigbee routers with reduced functionality (operating in mode 2). If a light acts as a Zigbee end device, it only occasionally (e.g. every 0.5 seconds or longer) retrieves from its parent node the lighting control messages received on its behalf from the house-level Zigbee network. The light may transform from being a normal mesh node (operating in mode 1) to an end-node (operating in mode 3) upon entering an RF-based sensing scan and accordingly the light determines a Zigbee parent node.

Alternatively, the light may transform from being a normal mesh node (operating in mode 1) to a Zigbee router with reduced functionality (operating in mode 2) upon entering an RF-based sensing scan. The light is then regularly but not constantly reachable on the Zigbee network to receive messages from the mesh. However, the light is not contributing to routing messages from other lights on the mesh network. The lights operating in mode 1 provided the backbone for a robust house-level mesh network. In an alternative embodiment, the light may be able to become officially (temporarily) unreachable on the Zigbee network when performing the RF-based sensing scan and the light only reports back to the mesh network without regularly checking a mailbox at the parent device.

In the above example, a Zigbee channel is used to perform RF-based sensing. It is also possible to perform RF-based sensing interactions based on out-of-band interactions between (1) a BLE (Bluetooth Low Energy)-equipped consumer electronics device and (2) a dual-radio light predominantly operating in BLE mode, wherein the light interfaces with the consumer electronics device via BLE and in this way forms a BLE-based RF-sensing pair.

It is advantageous to involve at least one consumer electronics device in the RF-based sensing. Most lighting nodes are ceiling mounted. However, RF-based sensing between two ceiling lights limits the detection quality of objects close to the floor (e.g. small children); consumer devices (e.g. TV, voice assistants) are located at lower height than lighting devices. Hence it is advantageous to include consumer electronics devices (e.g. TV) as one of the RF-based sensors, as the bio mass of the human, which is to be detected by the RF-based sensing, is then in between the ceiling light and the consumer device. As an alternative to a consumer electronic device, a light device which it not ceiling mounted may be involved.

When performing RF-based sensing with a consumer electronics device, the light and the CE device are not necessarily required to form a network. For instance, the lights may analyze (using a scavenging approach) the RSSI of BLE advertising sent out by each CE device. The light may also trigger the BLE device to send out messages on purpose. For example, the light sends via a BLE join request which in the end is not accepted by the light, but nevertheless triggers a response which can be used for sensing, as it contains RSSI embedded in it.

While the lights that perform a low-resolution RF-based sensing scan in one area of the house may do this in the standard Zigbee lighting-control band used by the lighting system, lights performing a high-resolution scan may utilize another dedicated wireless band. Preferably, the frequency channel choice for each of the lights take also into account the currently required RF-based sensing resolution for each of the occupancy-detection target areas, notably whether major motion detection vs. minor motion detection vs. true presence detection vs. people counting vs. body posture detection vs. gesture detection is required.

High-bandwidth RF-based sensing will be required for minor motion detection or people counting or for the "high-spatial-resolution" sensing mode, which is used to determine with high confidence whether a person is in room A or B. Hence, the higher the required sensing resolution, the higher the data rate of the RF-based sensing related communication between the lights will be. In addition, spreading out the RF-based sensing messages over time (i.e. equally distributing them on the time axis) will result in best occupancy detection as there are no prolonged blind periods. While regular RF-based sensing may be 3 messages per second per device, high resolution scans may employ 10 messages per second or even 100 messages per second.

Wireless interference caused by non-lighting devices (e.g. TV) affects a lamp's ability to perform RF-based sensing. To still be able to perform reliable presence detection in a noisy area of the house, normally, either the data rate of the RF-based sensing will need to be increased compared to a second more quiet area of the house or the wireless channel for RF-based sensing needs to be changed.

As different areas of the house suffer from different wireless interference sources, it is advantageous to select a dedicated relatively "quiet" wireless channel for RF-based sensing for each of the areas. The chosen out-of-band wireless channel for a specific area might change over time. For instance, for each RF-based sensing session, the channel may be newly determined. This may even be done during one sensing session. The out-of-band channel may be changed if the sensing results obtained are not as accurate as expected. However, choosing a new channel may lead to some latency since the baseline for the new channel needs to be determined.

It may even be that the system deliberately tries multiple out of band channels for an area (incl. evaluation of the achieved sensing quality) before settling on one. For instance, the trying out may encompass analyzing the number of false positives or false negatives of the RF-based sensing for each of the channels. Optionally, one single out-of-band RF-based sensing scan may utilize distinctly different wireless channels (e.g. lowest frequency 802.15.4 band vs 802.15.4 highest frequency band) in order to increase the accuracy of the occupancy detection by fusing the sub-scans. In the case of WiFi lights, different directionalities of the wireless transmissions may be employed utilizing the multiple directional antennas available in a modern WiFi radio.

In the case of a light of which the physical position can be easily modified (e.g. Philips Hue Go), the selection of the out-of-band channel may be based on a combination of (1) the accuracy of immediately previous RF-based sensing sessions (2) onboard sensors in the light that give a certain confidence on whether or not the light has recently been moved or rotated.

Additionally, two different RF-based sensing pairs of lights pairs can opt to utilize the same out of band channel. For instance, the lights may conclude that given (1) the physical characteristics of the involved luminaires (luminaire placement height, material of the luminaire) (2) parameters of the involved luminaires, which can be modified and influence the RF-based sensing (e.g. radio transmit power; open or closed lid of a luminaire, thermal stability), the respective motion signatures generated by the two pairs of lights will be sufficiently different, so that despite of the interference between the two RF-based sensing groups, reliable occupancy detections still can be performed. This could be relevant for areas where few suitable out-of-band channels are available (e.g. apartment building in New York City with many of the 2.4 GHz bands crowded).

Although the description on the last few pages describe an RF-based sensing (presence detection) application, some of the described principles may also be applicable to an RF-based asset tracking (location detection) application. On the next few pages, a third embodiment of the method of obtaining network messages in an RF-based asset tracking application is described. However, some of the described principles may also be applicable to an RF-based sensing application.

In addition, in some embodiments, the same lighting system may perform both RF-based motion/presence sensing (for objects without beacons) and asset-tracking of BLE equipped assets. In some embodiments, the same object such as a hospital crash cart or an employee with a BLE-beacon equipped badge is both detected by the RF-based sensing system and the BLE asset tracking system and both of the sensing modalities may be merged by the lighting system in order to improve the location accuracy and response time to the crash cart movements. The beacon transmissions described in this system may also include other sensing data such as asset temperature, orientation of the asset (setting a flag if the medical container ever turned upside down), battery status of a medical cool box.

Figure 10:
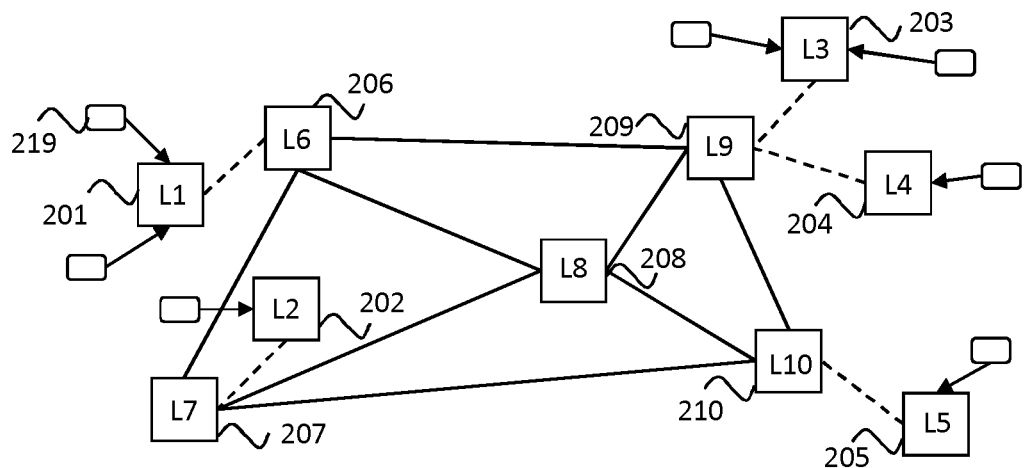
FIG. 10 depicts an example of a light network comprising ten luminaires.

In this third embodiment, ten luminaires 201-210, labelled L1-L10 and shown in FIG. 10, are grouped into different groups of luminaires that operate in different modes. The composition of the groups changes over time and as a result, the amount of RF-based asset tracking and the amount of message forwarding performed by a luminaire changes over time as well. Bluetooth Low Energy (BLE) beacons, e.g. beacon 219, have been attached to assets, e.g. objects, animals and/or persons, in order to allow their locations to be determined.

The controller, e.g. bridge 1 of FIG. 1, assigns a first group G1 consisting of luminaires 201-205 (L1-L5) in beacon receiver mode (BRM). The beacon receiver nodes collect the BLE beacons and determine the RSSI of the signals received from BLE tags mounted on assets. At the same time, these nodes intermittently listen to the Zigbee network (e.g. nodes in BRM mode may listen 99% on BLE and 1% listen and transmit on Zigbee) for lighting-related commands and to exchange lighting-controls data and asset tracking related data with the controller. The time distribution between BLE and Zigbee modes, and the frequency at which these devices check their parent node could be fixed, or could be variably configured by a controller device, or could even change dynamically based on the received beacon signals (e.g. if a G1 device detects a 'new' asset it might inform its parent (or the controller through its parent) right away, whereas measurements related to assets which are stationary in the area or are less critical devices to be tracked are sent in aggregated messages at some interval). The remaining luminaires 206-210 (L6-L10) (group G2) are configured as normal Zigbee routers (Network Canopy Mode, NCM) which have their BLE (reception) functionality deactivated or BLE functionality active only for a very short percentage of time.

If BRM devices would be configured as normal Zigbee routers while some of them, e.g. L1, would not be listening on the Zigbee network some/most of the time (since they are configured to listen for BLE beacons), this may create performance issues on the Zigbee network since the 'normal' devices, e.g. L7, who try to send a message to L1 will typically find that the message delivery fails since L1 is (some/most of the time) not listening to Zigbee. The basic mechanisms in Zigbee are not prepared for devices which are not available for some/most of the time.

Hence, all the luminaires within G1 may e.g. be configured to act as Zigbee end-devices (or routers with reduced functionality) and hence not (fully) participating in the Zigbee mesh network. Each of the luminaires in G1 will choose one of the Zigbee router devices (e.g. L6) as parent, and that parent is used for Zigbee communication with the L1 device (called child). When device L7 wants to send a message to such a child device, L7 will send the message to the parent device L6. The parent device will store that message on behalf of the child, e.g. L1. The child L1 will typically regularly check ('polling') with its parent L6 for any pending messages, and then retrieve and process them. A child L1 which wants to send a message to any of the devices on the Zigbee network will send the message to its parent L6, and the parent will take care of further relay of the message over the Zigbee mesh to its destination node.

As nodes in G1 need only limited time periods to communicate on Zigbee with their parent, they can listen for BLE messages most of the time. This approach maximizes the ability of G1 devices to perform high-quality asset tracking of the BLE beacons. This also circumvents the Zigbee groupcast/broadcast peculiarities mentioned above (as the Zigbee communication between G2 nodes will work normally as in Zigbee, and G1-G2 communication is normal Zigbee child-parent communication).

G1 devices collect the asset tracking data and send it (possibly after filtering and aggregation) to other devices via their parent. Asset tracking data could end up at one or more of the G2 devices, or a device connected via one or more of the G2 devices. All devices also function as the lighting network: they can be controlled from a central or distributed intelligence. G2 devices can be reached directly since they are Zigbee router devices. G1 devices can be reached via their parent (which is a G2 device). The same lighting Zigbee network can also be used to collect switch/sensor data from G1/G2 devices or other Zigbee devices.

Time slots for Zigbee child-parent communication can be chosen intelligently by the child if the device has learned when the BLE beacons typically come in and hence avoids those time slots for its Zigbee communication.

When some devices on the Zigbee network send commands to control the lighting, they will be received immediately by the router devices, e.g. L2. These will store it for the child devices, e.g. L1, and only when a child device, e.g. L1, polls its parent, it will find out about the pending message and can adapt its light level. This means that when e.g. the polling interval is set at 1 second, the light L1 will have a delayed response of between 0 and 1 second compared to the light L6. In certain situations, the 1 second delay is acceptable, for instance, if the lights are on and the user presses the wall switch to dim or switch off the lights or if another source of background lighting is already switched on in the room or if the light is switched automatically based on motion sensors/time schedules from the system without the end-user pressing a wall switch button and expecting instant response. In this case, the luminaires in group G2 immediately react to the dimming command (and hence provide visual feedback to the user that the press of the wall switch button is being processed).

The luminaires in group G1 have a delayed response. The delay between G2 and G1 can be mitigated by employing faded transitions for all lights (e.g. 3 seconds fade time to off). G1 may even be configured to "catch up" with G2 once G1 has finally received the dimming command. The delay between G2 and G1 can be further mitigated by letting one or more of the router devices, e.g. L6, send out a BLE message once it has a (time-critical) message for one or more of its child devices, to make them aware they need to poll their parent. It could also include the relevant body of the time-critical message in the BLE message. This would remove the latency otherwise associated with the End Device behavior for lighting devices.

The delay between G2 and G1 can be further mitigated by employing the following mechanism to allow communication as needed for lighting control, collection of data from light devices and sensors, and collection of the BLE beacon data. When lights are off, the polling rate is increased, so the perceived switch-on latency is reduced. When lights are on, the polling rate is reduced, as the (perceived) switch-off latency is of lesser concern, since the lights typically switch off some time after the last person has left the area (motion sensor) or when a person controls the central light switch at the perimeter of the area whilst on the way out.

BLE beacon data can be sent from L1 to L6 directly when one beacon is received, a number of beacons is grouped, or beacon data is even further processed (e.g. averaging a number of RSSI values from a particular beacon into aggregated values). There is a trade-off between asset tracking latency vs. Zigbee transmission time for the beacon data retrieval from child to its parent (and hence time available for BLE beacon listening).

Preferably, the composition of groups G1 and G2 varies over time. This may be achieved by rotating the function BRM⇔NCM for all the devices in groups G1 and G2. A straight swap of function BRM⇔NCM for all the devices in groups G1, G2 might leave the Zigbee network in a less-than-optimal state for a while, and also bring the BLE beacon reception to an initial state without knowledge of which devices are present (and their signal strength). Therefore, a more gradual change may be beneficial, e.g. first increase the number of NCM nodes, first decrease the number of NCM nodes or keep the number of BRM nodes constant.

Figure 11:
FIGS. 11-13 depict examples of dynamically assigning network nodes to function groups.
Figure 11:
Figure 11:
Figure 11:
Figure 11:
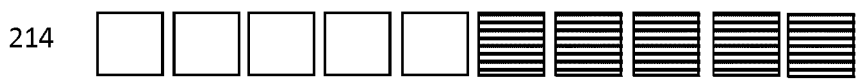
Figure 11:
Figure 11:
Figure 11:
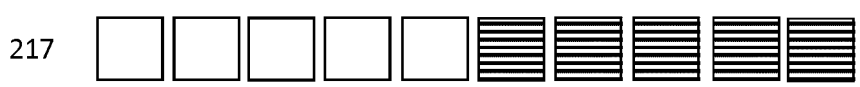
Figure 11:

Several options for a more gradual change are shown in FIG. 11. The luminaires L1-L10 are represented by columns 201-210, respectively. As a first option, in time periods 211-213, the number of NCM nodes is first increased. In period 211, each BRM/NCM group contains 5 network nodes. L1-L5 are BRM nodes and L6-10 are NCM nodes. In period 212, one node (L5) is switched from BRM to NCM. After some time, in period 213, another node (L10) is switched from NCM to BRM to bring the ratio back to the original ratio.

As a second option, in time periods 214-216, the number of NCM nodes is first decreased. In period 214, each BRM/NCM group contains 5 network nodes. In period 215, one node (L10) is switched from NCM to BRM. After some time, in period 216, another node (L5) is switched from BRM to NCM to bring the ratio back to the original ratio.

As a third option, in time periods 217-218, a direct swap is performed. In period 217, each BRM/NCM group contains 5 network nodes. In period 218, one node (L5) is switched from BRM to NCM, and at (approximately) the same time, another node (L10) is switched from NCM to BRM to keep the original ratio. Other options may alternative be used.

Figure 12:
Figure 12:
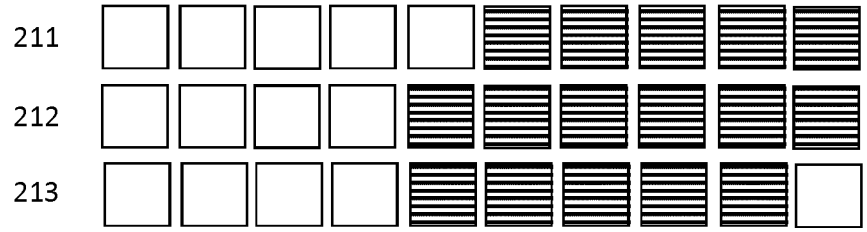
Figure 12:
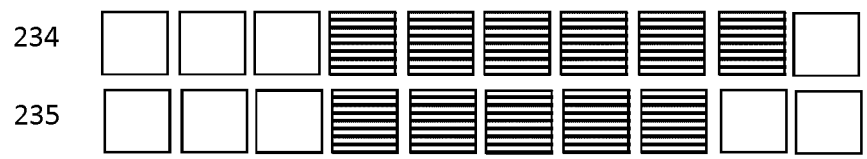
Figure 12:
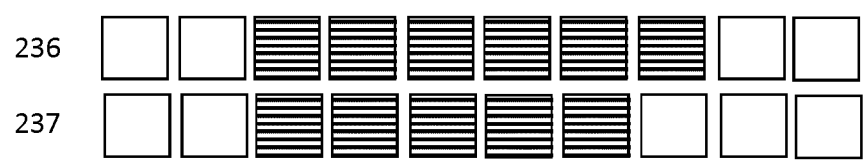
Figure 12:
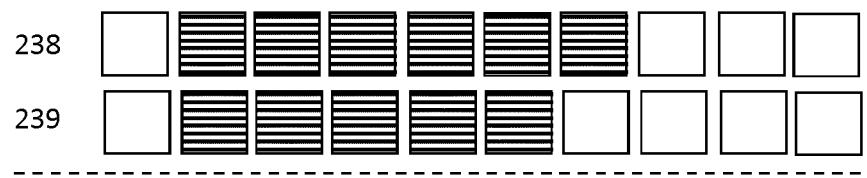
Figure 12:
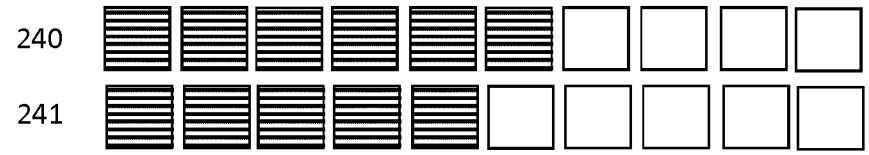

Repeated application of the steps shown in FIG. 11 may be used to achieve a swap of the roles of the devices in groups G1 and G2, see FIG. 12. In the example of FIG. 12, the steps 211-213 of the first option ("first increase the number of NCM nodes") are repeated several times. In period 234, one other node (L4) is switched from NCM to BRM. After some time, in period 235, another node (L9) is switched from BRM to NCM to bring the ratio back to the original ratio. In period 236, one other node (L3) is switched from NCM to BRM. After some time, in period 237, another node (L8) is switched from BRM to NCM to bring the ratio back to the original ratio.

In period 238, one other node (L2) is switched from NCM to BRM. After some time, in period 239, another node (L7) is switched from BRM to NCM to bring the ratio back to the original ratio. In period 240, one other node (L1) is switched from NCM to BRM. After some time, in period 241, another node (L6) is switched from BRM to NCM to bring the ratio back to the original ratio.

The sequence of steps leading from 211 to 241 in FIG. 12 have swapped the roles of all the involved nodes. The purpose of such swap is to be able to more accurately monitor the assets near L1-L5 at some time, and to also be able to accurately monitor the assets near L6-L10 at some other time. Hence, accurate asset tracking is possible in all locations. If no rotation mechanism were applied, accurate monitoring would only be possible near some of the nodes but not near the others, leading to a non-equal coverage of the overall area.

Figure 13:
Figure 13:
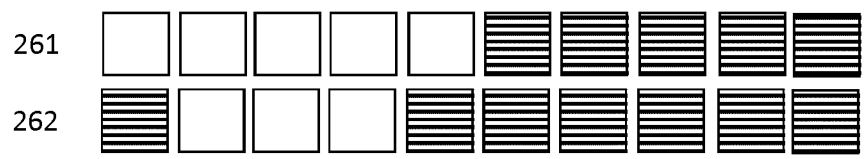
Figure 13:
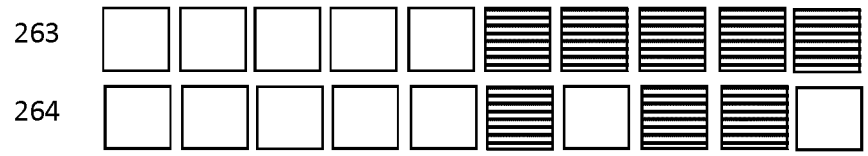

Similar change methods could also be used to dynamically change to a different ratio of G1/G2 nodes within the system (e.g. to enhance tracking performance if a new asset has entered a space), see FIG. 13. In period 261, each BRM/NCM group contains 5 network nodes. In period 262, some nodes (L1 and L5) are switched from BRM to NCM, thereby increasing the number of NCM nodes. In period 263, each BRM/NCM group contains 5 network nodes. In period 264, some nodes (L7 and L10) are switched from NCM to BRM thereby increasing the number of BRM nodes.

A changeover from router R to end-device ED (or vice versa) is not straightforward for a Zigbee device, since the specification (apart from a mention that a device could fall back from ED to R or vice versa at joining time if its parent has no space for it, which is not applicable here) and typical implementations are not prepared for this. For example, if a device known to other devices as an ED would silently switch roles and send a Route Request message, this would likely confuse other devices (because they do not expect a Route Request from an ED). This section will describe how such changeover can be performed within a Zigbee system without unwanted side-effects.

For both directions of role changes (ED=>R and R=>ED), the device will send a Leave message (so other devices in its direct neighborhood are aware it is no longer in the network; this will make them 'forget' about the device and its role, i.e. clear all the persistent and transient information stored about this device). This provides a standards-compliant way to enable the change, without requiring any additional changes on the other devices in the network. The device itself will remember the Zigbee channel and other relevant network characteristics such as PAN, EPID, network key, network update id, short address, Trust Center address and Trust Center link key (if used), etc. So, after changing role, it can be part of the network again, and start to function in its new role. It will re-join the network using the stored network parameters and credentials.

If a centralized security mode (i.e. Trust Center) is used, the device needs to announce itself (in its new role) with the Trust Center. Since the Leave message sent before (or the Update device message generated as a result by the parent) may be reaching the TC, it should be prevented that the TC removes all the information about the device switching roles. Since the orchestrator responsible for the role switching, e.g. the controller 1 of FIG. 1, may be the Trust Center itself, it could remember which devices were nominated for role change, and upon receiving the Leave/Update Device with status 0x02=device left from the nominated devices, the Trust Center could adapt some information about this device (e.g., the device type), rather than completely removing the entry.

ED=>R: After changing role, an ED which now functions a R will start periodically sending Link Status messages (these are normally sent at 15 second intervals) to maintain its connectivity in the mesh; preferably one such message is sent directly after rejoining the network, so other R devices in the neighborhood can take note of the new devices. Such other R devices who notice the newly added device has an empty list of neighbors in the Link Status message might respond earlier (than the normal 15s interval) with their own Link Status message so the new device knows which other routers are around to set up its neighbor tables—and thus get ready to communicate via the mesh.

An alternative way to quickly build up the routing tables for the device which changed role could to pre-populating these tables when switching to R, e.g.:
- start with the tables from the last time it was a R (might be outdated, some devices might no longer be a R);
- start with an initial neighbor table suggested by the orchestrator (who knows who is an R at this time); the orchestrator or device might know the (historic or recent) link costs for each connection;
- as a first approximation, the ED node switching to R can re-use some information from the time it was the ED, e.g. it could keep its parent router in its NT—which will already give it connection with the mesh—and extend the NT as it continues in the R role.

In both cases, updating the entries (both list of neighbors and the related link cost) based on received messages could be done in a different way than normally (e.g. different weights can be used to average the values over time, additional messages—not only the link status messages—may be used to add neighbor nodes, the frequency of sending messages may be increased), as the pre-populated devices and link costs might be outdated and hence less 'trustworthy' than live data.

Advantage of these methods (over normal 'starting from scratch') would be to send fewer messages between the devices to populate the neighbor tables. Another approach could be that an ED, during its operation as ED, listens to Zigbee traffic (promiscuous mode) and thus learns which devices are in the neighborhood, including signal strength and addressing information, and thus (after changing its role to R) uses this information to start its function as R.

R=>ED: Before changing the role from R to ED, it could be checked whether the R is performing any functions that could be affected by the switch, e.g. whether it is a parent for another ZED, whether it is routing on behalf of other devices, i.e. if it has any routing table entries (other than a many to one route to the concentrator/Trust Center/orchestrator), and/or whether it is forwarding communication on behalf of Green Power Devices as a proxy. If that is the case, the actions could be taken to minimize the impact of the switch. For example, just before switching (or sending the leave message), the R could send network status message with status route failure, so that a new route can be discovered; if still around when the related route discovery is started, the router could refrain from forwarding the route record messages.

To address its ZED children, the switching device could send a Leave Request message (with Rejoin=TRUE), thus forcing the ZED child to search for a new parent; when still around at the time the ZED starts with the parent discovery, the switching R could refrain from responding to the NWK rejoin requests. Alternatively, the orchestrator, e.g. the controller 1 of FIG. 1, could take care of those switching aspects, before or after the actual switch, e.g. creating a Proxy Table entry for the GPD on another node, sending the network status (route failure) message itself or sending a Mgmt_Leave_Request message with Rejoin=TRUE to the ZED being a child of the R about to switch.

After changing role, a R which now functions as ED will need to find a parent device. Normally, this process involves the ED sending a MAC Beacon message (or NWK rejoin message), followed by responses from all R which have received it (in case of the Beacon, even R in other Zigbee network), and selects a potential parent from the replying R devices. This is not very efficient (in time and network load), so in addition to the most obvious improvements, like restricting the network search to the PANID and operational channel of the network the ED used to work on as a R, several additional improvements can be used, e.g.:

- the device might remember the best (e.g. lowest link cost) neighbors (R devices) from its previous period as R, and send a (secure) NWK Rejoin Request to that R;
- preconfigured suggested parent from the orchestrating device, e.g. the controller 1 of FIG. 1, which tells the device to change its role from R to ED; that could be also sent as a broadcast message to the entire network. Sending such a message would make the sending of the leave message and the parent search obsolete. Further, receiving such a dedicated message could allow the receiving devices to keep the non-changing information about the switching node, e.g. the binding information, and only purge the changing information (e.g. the NT entries and routing table entries). This message could also remove the need for e.g. dedicated messages to instigate route repair;
- in yet another implementation, rather than sending the Leave message and then selecting the parent, the node that is about to switch from R to ED could send a new message, which contains both the information about the role switch, and the address of the new selected parent (e.g. the neighbor R with the best link cost). Sending such a message would remove the need for sending of the Leave message and the parent search. Further, receiving such a dedicated message could allow the receiving devices to keep the non-changing information about the switching node, e.g. the binding information, and only purge the changing information (e.g. the NT entries and routing table entries). This message could also remove the need for e.g. dedicated messages to instigate route repair.

By default, a device leaving the network would forget (delete) control information it had previously used, such as bindings, group membership, etc. Obviously, the light control would need to continue after the role change operation, so such loss of information should be avoided. As first step, the devices can remember this information and reuse it after changing role. Some examples ("switch" can also be read a "sensor"):

- a lamp which is controlled from a switch, and the switch sends a Leave message: normally the switch would forget which lamp(s) it was controlling. In a preferred implementation, the switch would remember the list of the lamp(s) it was controlling, which could be a list of unicast or groupcast addresses;
- a lamp which is controlled from a switch in unicast, and the lamp sends a Leave message: the switch will remove the lamp from its binding table (because of the Leave message), so the lamp (or another device, such as the orchestrator, e.g. the controller 1 of FIG. 1) needs to reestablish the binding;
- a lamp which is controlled from a switch in groupcast, and the lamp sends a Leave message: the switch will not remove the lamp from its binding table (because it is a group being sent to), so the lamp would need to remember its group(s) membership(s) and associated settings.

Several of the above mechanisms (naming particular command functions) assume use of the current Zigbee standard. Obviously, one could define extensions to the Zigbee mechanisms and messages (e.g. a "I'm switching role" message) and implement these on the devices to achieve a smoother changeover (with potentially fewer messages, or faster convergence).

For a dense grid of luminaires with a small portion of the luminaires acting as beacon receiver, the RSSI beacon receiver functionality may be deliberately rotated from a first light to a second light which is not adjacent the first light but rather further away. This ensures proper tri-lateration of the asset using the aggregated RSSI data obtained in the time period before and after the rotation.

The moment when to reverse roles between G1 and G2 may be selected based on the least possible expected disruption to the overall application and end-user experience (e.g. when lights in a certain area are currently switched on, introducing some lighting latency due to execution of the role reversal is acceptable, or respect, if some luminaires in the system are performing a high resolution RF-based sensing scan, the high resolution RF-based sensing scan and hence wait until it is finished).

One or more central nodes collect the RSSI data from the various nodes. Since RSSI data from the assets is collected only part-time on each node, the asset tracking system needs to handle the missing RSSI data samples, and the fact that they have been sampled some time ago, and can also exploit the combined data from multiple network nodes receiving beacons—even though these multiple network nodes do not (actively) receive and process the beacons at the same time.

This advantageously can provide improved tri-lateration of assets and/or their tracking. The processing may take into account that assets may be moving, so 'live' data can be considered more reliable than 'past' data (which may have resulted from the assets being in a different position). It may also take into account additional data regarding the movement of assets. Example: if there is also a motion sensor in the room (PIR or RF-based sensing), and no motion is detected, likely the assets will also not move (typically they get moved by the humans who get detected by the motion sensor when moving). On the other hand, if there is motion detected in a part of the area assets in that area might move within the area, or into or out of the area. In this case, once the RF-based sensing has detected movement, the joint RF-based sensing and asset tracking system may change its focus from predominantly motion sensing to predominantly asset tracking. This is advisable, because the more the light is listening via BLE to asset tags, the less time it can spend on performing RF-based sensing with the Zigbee radio.

Variant 1: Directed Asset Search

Preferably, the controller, e.g. bridge 1 of FIG. 1, dynamically and adaptively assigns the (1) ratio of luminaires are acting as tracking nodes and non-tracking nodes, (2) the respective locations and (3) duty cycle for BLE vs. Zigbee (and optionally reporting strategy for 'new' or 'high-value' assets vs. other assets) while taking into account:

the context of the lighting controls system (e.g. how many lighting commands are expected in this period and what are the lighting latency requirements)

the context of the data collection system (e.g. there may be periods when a central device collects data from many devices)

the context of the asset tracking system, e.g.:
- If a new asset starts has entered the room, the number of luminaires of beacon receivers may temporarily be increased in order to quickly obtain an accurate location fix.
- If a moving person is being tracked, the beacon receiving intensity of the asset tracking function in the joint system is increased.
- Expected movement trajectories of assets based on historical data.

When there are indications that assets are moving or could be moving, the system can dynamically optimize the distribution of BRM/NCM functions to make sure BRM nodes are active near the potentially moving assets, to improve tri-lateration accuracy and/or speed.

As a first example, if there is motion detected in a part of a space (especially near a door), assets may come into or leave the space there, so enhanced asset tracking performance is desired in this part of the space. This could be achieved by assigning additional BRM nodes (adjusting the ratio BRM/NCM for some period) or a "shift" of the BRM nodes to the area (while keeping the ratio BRM/NCM more or less constant).

As a second example, if a certain high-value asset is detected, more BRM nodes in that area are temporarily activated to get a faster and/or more accurate fix. As a third example, the allocation may be based on historic data for specific assets or a type of assets (cleaning trolleys typically are in other positions than emergency crash carts, and may typically move at a different speed and pattern).

Variant 2: Transitional Mode Between NCM and BRM

To ensure Zigbee network stability at any given moment, hard swapping of the Zigbee router/end-device functionality between the modes should be avoided. Hence, this variant proposes a mechanism where lights gradually migrate between the Beacon Receiver Mode and Network Canopy Mode via an additional mode, transitional mode (TM). Devices in transitional mode (TM) are in the process of migrating between Primary-Zigbee (NCM) functionality and primary-BLE-asset-tracking mode (BRM), while taking the needs of the networking canopy (network coverage) in mind. Devices in mode (TM) may for instance act as Zigbee Router or Zigbee router with reduced functionality to keep the network canopy functional while still acting as beacon receivers (e.g. 50% beacon receiver and 50% Zigbee routing node).

Hence in this variant, the devices have three possible modes, for instance:
- Zigbee routers 100% of the time (NCM)
- BLE receivers 99% of the time and Zigbee End Device 1% of the time (BRM)
- 50% Zigbee routers and 50% BLE receivers part time (TM)

For the "TM" devices, it may be advantageous to:
- not route traffic through such nodes since the other router devices can communicate with them only part of the time. One mechanism is setting the Link Cost field, in Link Status messages and/or when forwarding Route Requests, to a high value (meaning high cost) to discourage the other nodes to route traffic through the TM node. Another one is to delay forwarding of Route Request, or not forwarding them at all, which prevents routes being constructed through the TM node.
- let them not be the parent of a Zigbee end device, as the parent (the TM device) may be unavailable on Zigbee when the end device wants to communicate.

Variant 3: BRM Nodes Receive Messages, but do not Rebroadcast Messages

As alternative to defining BRM nodes as Zigbee End Devices, the BRM devices may be commissioned not to rebroadcast messages received from other nodes. These BRM nodes may hence act on the Zigbee network as router without routing functionality i.e. the BRM nodes act like a Zigbee routing device only for its own traffic but is not routing messages originating from other devices (i.e. the BRM device does not respond to the route discovery messages of other nodes). This approach may be advantageous over making BRM nodes Zigbee end-device, which does not receive broadcast directly and hence require buffering of messages by parent nodes. The router nodes without routing functionality will not require buffering. It should be noted that as Zigbee end-devices are required to poll their parents regularity for messages, this causes additional network traffic, and latency in sending messages to such devices. The "not rebroadcasting" could be selective, e.g. by rebroadcasting more important lighting control messages (such as "on") and not rebroadcasting less important messages.

Variant 4: Additional Group of Luminaires Receives Messages, but does not Rebroadcast Messages In addition to a group of nodes that are configured as normal Zigbee routers (NCM) and a group of nodes that are configured as Zigbee end devices (BRM), there may be an additional group of nodes that are configured as Zigbee router without routing functionality. Nodes in the vicinity of the BRM nodes may be put in this group in order to prevent interference to the BRM nodes, as explained in relation to FIG. 8 (where this group was referred to as "second subset").

Figure 14:
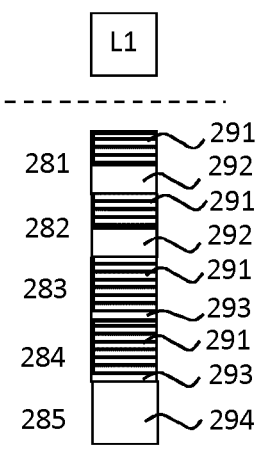
FIG. 14 depicts an example of a time-varying allocation of a node to function groups.

The operating mode of a node is preferably changed while the node is in use, as described in relation to second embodiment of the method (see FIG. 9) and the third embodiment of the method. An example of luminaire L1 changing operating modes is shown in row 201 of FIG. 14. In this example, luminaire L1 acts as Zigbee router with reduced (routing) functionality (operating mode 2 of FIG. 9) in periods 281 and 282, as Zigbee end device (operating mode 3 of FIG. 9) in periods 283 and 284 and as normal Zigbee router (operating mode 1 of FIG. 9) in period 285.

In parts 291 of the periods, luminaire L1 performs RF-based asset tracking (or RF-based sensing in an alternative embodiment). In parts 292-294, luminaire L1 obtains network messages. In parts 292 and 294, luminaire L1 receives network messages from normal Zigbee router nodes. In part 293, luminaire L1 obtains network messages from its parent node. In part 294, luminaire L1 further forwards network messages that it received and that were intended for other nodes. Luminaire L1 may also transmit its own network messages to other Zigbee devices (i.e. network messages not received from other Zigbee devices) in parts 292-294.

Variant 5: Dual-Radio Lighting Control/Asset Tracking for a Thread Mesh Network

In this variant, the Thread protocol is used for lighting control messages instead of the Zigbee protocol. The Thread standard allows a maximum of 32 routers per network, with the rest of the devices being non-router nodes (end device). Thread describes a router node selection protocol based on criteria e.g. the total number of routers in the network, number of neighbors, link quality with neighbors, and router tables of neighboring routers. If in Thread, one of the end devices loses its connection to its router node, then the end device itself starts to search for another router. The Thread standard also describes the mechanism for end devices transitioning to become router nodes and vice versa e.g. if an end device thinks it is better suited to become a router, it requests to become a router. If a Thread router node stops acting as router node (change to end device role), it informs its respective child devices that they have to switch to an alternative router node as parent.

The Thread networking standard has some functionality relevant in the context of this invention, compared to the Zigbee-based examples described above. In Thread, there are 2 device types and 6 device roles; the device type is fixed, while the role of devices can change over time. The 2 types of devices are the following: (a) full Thread device (which can have one of these roles: Leader, Router, REED, FED), and (b) minimal Thread device (which can have the MED and SED roles).

The 6 roles a device can have are the following (the first three of these are Routers (R), the last three are End Devices (ED)):

Leader (elected router, bookkeeping, list of routers)
Router
REED (Router Eligible End Device: it could be router but is inactive currently, i.e. working as ED; REED=FED+ runs algorithm to check if it needs to become router)
FED (Full End Device; FED=MED+has one parent, links to multiple devices to receive multicast)
MED (Minimal End Device: has one parent, its radio is always on, its parent expects the MED to be awake, messages are sent via parent, and MED has no mechanisms to cope if parent message does not successfully arrive)
  the MED device described in the current Thread standard is hence not suited to directly serve as a dual radio (Thread+BLE) luminaire, as an MED needs to listen to Thread messages constantly and has no time to listen to BLE messages.
SED (Sleepy End Device: like MED, but sleepy as far as Thread is concerned)
  This SED is the only one which can sleep (as far as Thread is concerned), though in the present invention, the device may use the time it is not listening on Thread to listen to another channel (BLE); others are always listening as Thread device.

So, for dual radio luminaires, the BRM devices would use the SED role, and the NCM devices would use one of the "router" roles (leader, router, REED). Changing roles is allowed in the Thread spec, so changing from SED to one of the other (router) modes and vice versa should not be a problem like in Zigbee (see above description of Zigbee and measures to work around the issues).

One aspect to take into account is the automatic balancing of the number of nodes of a certain type in a Thread network:

For large networks, Thread by default allocates about 23 devices as R, rest as ED.
In Thread, if there are more than about 23 routers in a system, R volunteers to become ED.
If there are fewer than about 23 routers in a system, ED requests to become R.

This is an automatic allocation based on local interaction between the devices, using a distributed algorithm. Such automatic allocation will not result in what is desirable for a combined lighting+asset tracking network, since in Thread's automatic allocation, all Thread routers may sometimes end up at the left side of the room and all ED on the right and this hampers tri-lateration for asset tracking. Additionally, there are no triggers in Thread to dynamically change the role over locations (which is needed to improve tri-laterations).

As described above, it is advisable to orchestrate the assignment of routers to obtain a suitable distribution of devices for the asset tracking application. To prevent automatic assignment of Thread routers, the Thread standard already allows that a central point can tell a device (via an out of band channel) to change role; the device then informs it neighbors about its changed role. Hence the Thread protocol already provides nice hooks and standard messages for this, while Zigbee lacks those messages, as explained above.

The following sequence describes how to implement the role-changing between NCM and BRM in a Thread system, using the roles of Thread Routers (R) for NCM and Sleepy End Devices (SED) for BRM:

BRM=>NCM (SED=>R): An SED would first attach as a normal ED, then upgrade to a router, then downgrade others to ED to SEDs (NCM=>BRM). For autonomous changes, the Thread spec has delays (0-120s) for stabilization; this might be too long for the application. If such change were done in an orchestrated way, this could be performed within seconds. It should be noted that change messages may lead to peaks in network traffic; hence Thread applies a trickle time mechanism which gradually increases when things are stable. It is preferable to apply central orchestration of the role changes, which enables at network level gradual role changes to prevent change-message traffic peaks.

In a sparse Thread network with a limited number of nodes (e.g. in a residential applications), all Thread devices become routers after a few minutes. Preferably, even in such a sparse Thread network, some devices are deliberately configured as sleepy end-device SED so that they have sufficient time to listen for BLE beacons signals transmitted by the asset tags. This may require modification of the Thread stack in these devices if the Thread stack complies with the current Thread standard.

Variant 6: More Sparse Networks e.g. Philips Hue Network
Networks used in a professional lighting application such as office or hospital typically have many nodes, so division of the nodes into groups with different functionality can likely be achieved without effectively impacting the performance and 'health' of the Zigbee network.

In a sparse network, such as a home lighting application, it may be more challenging to apply these mechanisms, as the roles need to be allocated and changed carefully to make sure that both the Zigbee network keeps fully functional as well as the Beacon Receiving (asset tracking) functionality keeps functional with acceptable tracking performance. On the other hand, in such a home environment, repeated swapping the mode swap between G1 and G2 might increase location accuracy, while ensuring sufficient Zigbee network performance.

Since a typical home network has fewer nodes than a typical professional lighting application network, it is expected that the Zigbee network load is lower, and also the number of tagged assets is lower. Therefore, one might use a few devices out of the total number of devices for BRM while maintaining a working Zigbee mesh with the majority of the nodes configured as NCM. Rotating the roles will allow to get more accurate coverage of the asset location.

In addition, in home networks some lights may be temporarily depowered by a mains voltage wall switch and hence temporarily cannot contribute to the asset tracking system. Hence, upon depowering of a light, the system reconfigures the distribution of nodes between G1 and G2 until the light is powered up again.

If insufficient nodes are available to perform both asset tracking and RF-based sensing in a certain area of the home, the system disables one of the two functionalities depending on the context. For instance, if the home owner is out of the house, RF-based motion/occupancy sensing is performed to monitor the house for possible intruders. If the owner is at home, the system may disable the automatic lighting control with RF-based sensing (and the user has to use the battery-operated wall switch instead), while the system still tracks the location of a BLE equipped consumer device across the house.

Variant 7: WiFi+BLE Combined Radio

Likely, in the future, lights will be controlled with a WiFi lighting control network, for instance using the 802.11s standard. WiFi chips now already commonly feature a BLE radio as well. Hence, this will allow for time-shared BLE+ WiFi combo radios in lights, wherein the BLE radio is used to receive beacons and WiFi provides the networking canopy.

The WiFi 802.11s standard distinguishes between router nodes and end devices. In a WiFi solution, luminaires can either act as Mesh AP (interfacing to the user's smartphone via WiFi in a standalone network without gateway) or Mesh node (no AP at the luminaire; the smartphone talks with the central gateway).

In an embodiment, some of the WiFi lights act semi-concurrently as beacon receivers. In this embodiment, the WiFi lights are assigned to either act as Wifi Mesh AP node or as WiFi Mesh Node or as WiFi Mesh AP+Beacon Receiver node or as WiFi Mesh Node+Beacon receiver node.

Extension 1: Take into Account the Current Lighting Latency Requirements

When the lights are off during a time of the day when electric lighting is required or in a space without daylight, typically no persons are present, so assets cannot move in this space/room. Hence it is possible to increase the number of NCM nodes within this space and/or increase the polling rate of the BRM nodes to their parents—both with the goal of fast reaction when the lights need to switch on. Additionally, the network canopy of the overall system is strengthened by now having more NCM modes from the un-occupied sub-space.

It should be noted that the fact that within each space there is a mixture of NCM nodes (which will react directly) and BRM nodes (which will react with some latency due to required polling of the parent) will have a limited effect on the perceived latency by the end-user, as many of the lights (the NCM nodes) will switch on immediately, which visually hides the fact that some nodes (the BRM nodes) might be slower to respond. Employing a transition time (for all nodes but especially the NCM nodes) also helps to hide this fact. Optionally, it may be possible to smartly shorten the dimming transition time for the BRM nodes in a way so that the end-point of the light-fading process of the BRM nodes coincides with the endpoint of the NCM devices, despite starting with a delay.

When the lights are on, typically persons are present in the space, so assets can move. Hence, it is beneficial to increase the number of BRM nodes to be able to accurately track the assets whenever the light is on in this space. Latency for light control is of lesser concern when the light is on—typically the lights need to be switched off some time after the last person has left the room, so any latency impact for the switch-off command on some nodes is likely to go unnoticed.

Extension 2: Clever Moment of Polling

A Zigbee End-Device once in a while needs to talk to its parent (but rarely) so it misses a short period of BLE beacons. Since BLE beacons are sent in a regular pattern, it can advantageously poll its Zigbee parent at a moment when BLE beacons from known assets in its area are not expected.

Figure 15:
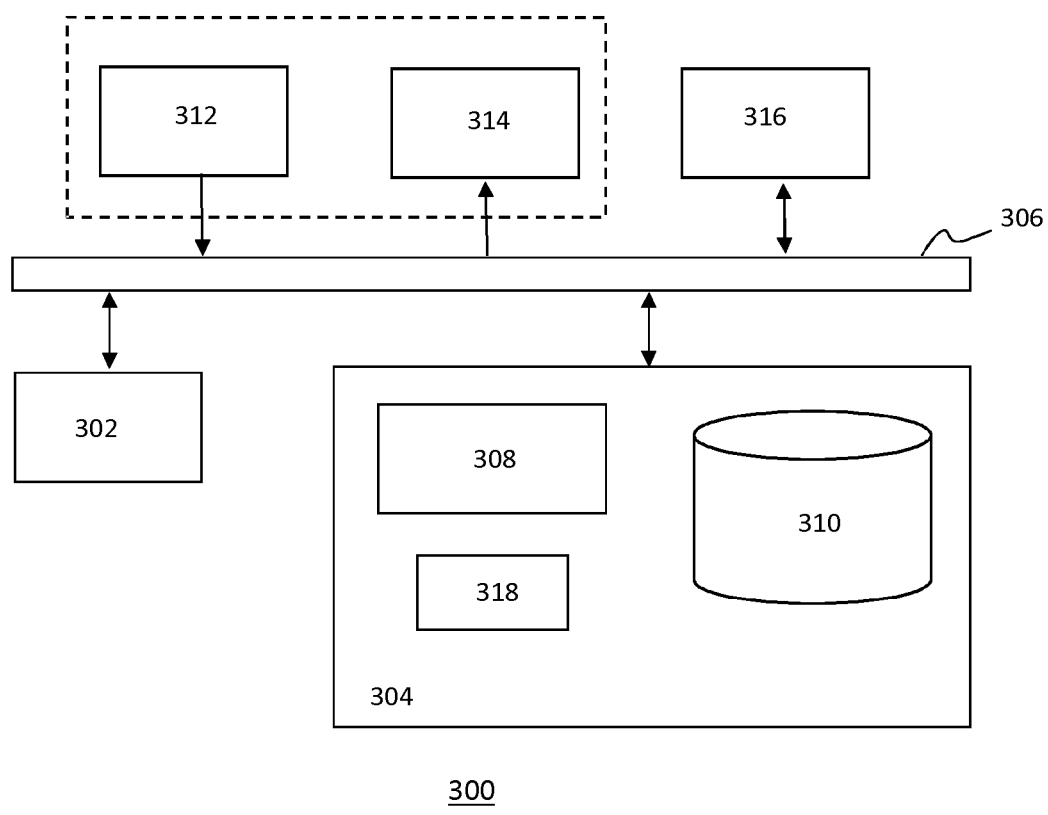
FIG. 15 is a block diagram of an exemplary data processing system for performing the method of the invention.

FIG. 15 depicts a block diagram illustrating an exemplary data processing system that may perform the method as described with reference to FIGS. 2-6 and 8-9.

As shown in FIG. 15, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that can perform the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 15 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 15, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 15) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for selecting one or more devices in a wireless network for transmitting, receiving and/or processing a radio frequency signal for presence and/or location detection and performing network communication, said system comprising at least one processor configured to:
   determine a suitability of each of a plurality of devices for transmitting, receiving and/or processing a radio frequency signal for presence and/or location detection while leaving sufficient resources for network communication, wherein said plurality of devices comprises at least one light device; and wherein network communication comprises transmitting network messages of a lighting control system;
   select a subset of devices from said plurality of devices based on said suitability determined for each of said plurality of devices;
   instruct at least one of said subset of devices to act as a device for transmitting, receiving and/or processing a radio frequency signal for presence and/or location detection;
   determine at least part of said suitability of a device of said plurality of devices based on historical data relating to said device and/or by assessing said device's spatial location and/or environmental condition; and
   determine a transmission power and/or directionality for a radio frequency signal to be transmitted by said device based on said device's spatial location.

2. A system as claimed in claim 1, wherein said at least one processor is configured to determine at least part of said suitability of a device of said plurality of devices by assessing expected and/or past use of a lighting and/or network function of said device and/or any other expected and/or past use of said device.

3. A system as claimed in claim 1, wherein said at least one device uses a first protocol to transmit, receive and/or process said radio frequency signal and a second protocol to transmit and/or receive network messages.

4. A system as claimed in claim 1, wherein said at least one processor is configured to determine at least part of said suitability of a device of said plurality of devices by assessing at least one of: said device's hardware capabilities, said device's one or more RF characteristics, said device's mounting orientation, wireless interference close to said device, and whether said device is operated by a battery-operated wall switch or a legacy wall switch, an occupancy sensor, a motion sensor, a sensor bundle, a window blind controller and/or a mains-powered wireless switch.

5. A system as claimed in claim 1, wherein said at least one processor is configured to select said subset of devices as part of commissioning said plurality of devices and/or after commissioning said plurality of devices.

6. A system as claimed in claim 1, wherein said at least one processor is configured to determine said suitability of each of said plurality of devices for transmitting, receiving and/or processing said radio frequency signal by determining a suitability of a plurality of groups of said plurality of devices for transmitting, receiving and/or processing said radio frequency signal, each of said plurality of groups comprising at least two of said plurality of devices.

7. A system as claimed in claim 6, wherein said least one processor is configured to determine whether two of said plurality of groups have a device in common and target a same or adjacent sensing area and determine one of said two groups not to be suitable in dependence on said determination.

8. A system as claimed in claim 1, wherein said least one processor is configured to determine whether a communication quality between a pair of said plurality of devices is below a certain threshold and determine said pair not to be suitable in dependence on said determination.

9. A system as claimed in claim 1, wherein said least one processor is configured to
- determine, at a later moment, a further suitability of each of said plurality of devices for transmitting, receiving and/or processing said radio frequency signal,
- select a further subset of devices from said plurality of devices based on said further suitability determined for each of said plurality of devices, and
- instruct at least one of said further subset of devices to act as a device for transmitting, receiving and/or processing a radio frequency signal for presence and/or location detection.

10. A system as claimed in claim 1, wherein said at least one processor is configured to determine said suitability of each of said plurality of devices for transmitting, receiving and/or processing said radio frequency sensing signal for a certain type of detection.

11. A method of selecting one or more devices in a wireless network for transmitting, receiving and/or processing a radio frequency signal for presence and/or location detection and performing network communication, the method comprising:
- determining, by at least one processor, a suitability of each of a plurality of devices for transmitting, receiving and/or processing a radio frequency signal for presence and/or location detection while leaving sufficient resources for network communication; wherein said plurality of devices comprises at least one light device; and wherein network communication comprises transmitting network messages of a lighting control system;
- selecting, by at least one processor, a subset of devices from said plurality of devices based on said suitability determined for each of said plurality of devices;
- instructing, by at least one processor, at least one of said subset of devices to act as a device for transmitting, receiving and/or processing a radio frequency signal for presence and/or location detection;
- determine at least part of said suitability of a device of said plurality of devices based on historical data relating to said device and/or by assessing said device's spatial location and/or environmental condition; and
- determine a transmission power and/or directionality for a radio frequency signal to be transmitted by said device based on said device's spatial location.

12. A non-transitory computer readable medium comprising a computer program product storing at least one software code portion, the software code portion, when run on a computer system, is configured for perform the steps of claim 11.

13. A system for selecting one or more devices in a wireless network for transmitting, receiving and/or processing a radio frequency signal for presence and/or location detection and performing network communication, said system comprising at least one processor configured to:
- determine a suitability of each of a plurality of devices for transmitting, receiving and/or processing a radio frequency signal for presence and/or location detection while leaving sufficient resources for network communication, wherein said plurality of devices comprises at least one light device; and wherein network communication comprises transmitting network messages of a lighting control system;
- select a subset of devices from said plurality of devices based on said suitability determined for each of said plurality of devices;
- instruct at least one of said subset of devices to act as a device for transmitting, receiving and/or processing a radio frequency signal for presence and/or location detection;
- determine, at a later moment, a further suitability of each of said plurality of devices for transmitting, receiving and/or processing said radio frequency signal;
- select a further subset of devices from said plurality of devices based on said further suitability determined for each of said plurality of devices; and
- instruct at least one of said further subset of devices to act as a device for transmitting, receiving and/or processing a radio frequency signal for presence and/or location detection.

* * * * *